US008126462B2

(12) United States Patent  
Thakare

(10) Patent No.: US 8,126,462 B2  
(45) Date of Patent: Feb. 28, 2012

(54) REDUCTION IN HANDOVER INTERRUPTION IN WIRELESS COMMUNICATION SYSTEMS

(75) Inventor: Kiran Thakare, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 980 days.

(21) Appl. No.: 12/105,650

(22) Filed: Apr. 18, 2008

(65) Prior Publication Data

US 2009/0111470 A1   Apr. 30, 2009

Related U.S. Application Data

(60) Provisional application No. 60/996,012, filed on Oct. 25, 2007.

(51) Int. Cl.
*H04Q 7/20* (2006.01)

(52) U.S. Cl. ........ 455/436; 455/437; 455/458; 455/522; 455/450; 455/451; 370/331; 370/328; 370/335; 370/329; 370/438

(58) Field of Classification Search .......... 455/436–439, 455/442, 416, 423, 458, 450–451, 522; 370/331, 370/328, 335, 329, 438
See application file for complete search history.

(56) References Cited

U.S. PATENT DOCUMENTS 6,968,186 B2 * 11/2005 Pittampalli et al. ........ 455/422.1
2002/0068566 A1   6/2002 Ohlsson et al.
2007/0258407 A1   11/2007 Li et al.
2008/0161000 A1   7/2008 Li et al.
2008/0318578 A1 * 12/2008 Worrall .................. 455/437

FOREIGN PATENT DOCUMENTS

EP   1 594 336 A2   11/2005

OTHER PUBLICATIONS

International Search Report dated Feb. 5, 2009 (5 pages).
Kiran Thakare et al., IEEE C802.16maint-08/085rl, IEEE 802.16 Broadband Wireless Access Working Group, "Handover Optimization: Reduction in HO interruption latency for IEEE 802.16Rev2", Jan. 16, 2008 (8 pages).
Ling Chen et al., "A Cross-layer Fast Handover Scheme for Mobile WiMAX", Oct. 15, 2007 (5 pages).
Shashikant Maheshwari et al., IEEE C80216maint-07/058, IEEE 802.16 Broadband Wireless Access Working Group, "Handover Optimization", Nov. 4, 2007 (8 pages).

* cited by examiner

*Primary Examiner* — Charles Appiah
*Assistant Examiner* — Michael Vu
(74) *Attorney, Agent, or Firm* — Nixon & Vanderhye P.C.

(57) ABSTRACT

In a wireless network, a mobile station is in a serving radio link with a serving base station. A handover is desired so that the mobile station can establish a target radio link with a target base station. When the handover process is initiated, the target base station is alerted about the impending handover by the serving base station. The target base station allocates a radio resource set and provides information on the radio resource set piggy-backed onto an alert response message to the serving base station. The serving base station relays radio resource set piggy-backed onto either a handover request or response message to the mobile station. The mobile station breaks the serving radio link with the serving base station and establishes the target radio link using the radio resource set.

35 Claims, 21 Drawing Sheets

REDUCTION IN HANDOVER INTERRUPTION IN WIRELESS COMMUNICATION SYSTEMS

RELATED APPLICATION

This application claims the priority and benefit of U.S. provisional patent application 60/996,012 entitled "HANDOVER OPTIMISATION: REDUCTION IN HO INTERRUPTION IN WIMAX" filed Oct. 25, 2007, which is incorporated herein by reference in its entirety.

TECHNICAL FIELD

The technology of this disclosure is generally related to optimizing a handover of a mobile station from one or more serving base stations to one or more target base stations. In particular, the technology is related to minimizing handover interruption time in wireless networks such as WiMax.

BACKGROUND

In a wireless communications system, performing a handover is a common occurrence. As illustrated in FIG. 1A, the handover is a process in which a radio link between a mobile station 110 and one (serving) base station 120 is broken and a radio link between the mobile station 110 and another (target) base station 130 is established. A common reason for performing the handover is when the mobile station 110 in a network 100 moves from a cell area served by the serving base station 120 to a cell area served by the target base station 130. Another common reason is to balance the service load of the base stations within the network.

There are two handover types—the "make-before-break" and the "break-before-make" types. In the make-before-break handover, otherwise known as a soft handover, the radio link between the mobile station and the target base station is made before the radio link between the mobile station and the serving base station is broken. Since the mobile station is always in radio communication through at least one base station, there is little to no disruption in service.

In the break-before-make or "hard" handover (sometimes called a "handoff"), the radio link with the serving base station is broken before the link with the target base station is established. Thus, in contrast to the soft handover, there is a duration of time—interruption time—in which the mobile station is not exchanging data with the network. If the interruption time is substantial, then the network service can degrade.

FIG. 1B illustrates an existing, WiMax signal flow for a mobile station initiated hard (break-before-make) handover that uses a ranging request (RNG-REQ) message and a ranging response (RNG-RES) message. The hard handover includes a scanning phase, a handover preparation phase and a handover execution phase. As illustrated, the mobile station scans—i.e., searches—for potential target base station(s) and collects information about the potential targets. The mobile station decides, during the handover preparation phase, that the handover is required and sends a mobile station initiated handover request (MOB_MSHO-REQ) message to the serving base station. The serving base station in turn alerts the target base station by sending a handover pre-notification/request (HO Pre-notification REQ/HO-REQ) message. The target base station responds by sending a handover pre-notification/response (HO Pre-notification RES/HO-RES) message to the serving base station. The serving base station then responds to the mobile station by sending a handover response (MOB_BSHO-RES) message to the mobile station. The mobile station acknowledges the response message by sending a handover indication (MOB_HO-IND) message to the serving base station. The MOB_HO-IND message marks the ending of the handover preparation phase and the beginning of the handover execution phase.

The contents of the MOB_HO-IND message indicates whether the mobile station is ready to proceed with the handover execution or wishes to cancel the handover. If the MOB_HO-IND message indicates that the mobile station is ready to proceed, the radio link between the mobile station and the serving base station is broken. The serving base station notifies the target base station that the handover execution has been initiated by sending a HO Notification/HO-Cnf (confirmation) message to the target base station.

The target base station then allocates a ranging request (RNG-REQ) radio resource set for the mobile station to use to perform a ranging process (described in more detail below) with the target base station. After the RNG-REQ resource is allocated, the target base station provides information on the RNG-REQ resource to the mobile station. Using the RNG-REQ resource, the mobile station initiates the ranging process by sending a ranging request (RNG-REQ) message to the target base station. The target base station responds by providing a ranging response (RNG-RES) message to the mobile station. Based on the contents of the ranging response message, the mobile station adjusts its transmission parameters and the radio link between the mobile station and the target base station is established completing the handover.

The ranging process is a process of acquiring the correct timing offset and power adjustment to align with the target base station. For example, if the mobile station is relatively far from the target base station, the target base station may decide that the mobile station should transmit at a relatively high power level so that the base station can receive signals of adequate strength from the mobile station. Conversely, if the mobile station is relatively close, then the transmission power can be set relatively low so signal interferences are minimized.

FIG. 1C also illustrates an existing WiMax signal flow like FIG. 1B, except that the hard handover is initiated by the serving base station instead. When the serving base station initiates the handover, it sends the HO Pre-notification REQ/HO-REQ message to the target base station and the target base station responds with the HO Pre-notification RES/HO-RES message. Assuming that the target base station is ready for the handover, the serving base station sends a base station initiated handover request (MOB_BSHO-REQ) message to the mobile station to instruct that it (the mobile station) should proceed to execute the handover. The remainder of the process is similar to the process as described with respect to FIG. 1B.

The handover execution phase includes a handover interruption time (a duration between when the mobile station sends the MOB_HO-IND to serving base station to when target base station has received the acknowledgement on the downlink (DL) control channel allocated to the mobile station), the mobile station cannot exchange data with the network since the radio link with the serving base station is broken and the radio link with the target base station has not yet been established.

This handover latency, i.e., the interruption time, can have adverse effects on services provided by the network to the end user. The interruption time can amount to as much as 145 ms in existing telecommunications systems like the WiMax. For a service such as voice over IP (VoIP) or highly interactive services such as games, the 145 ms interruption delay for the WiMax system can be detrimental to its functionality and to end user perceptions of quality. Additionally, longer interruption time require larger buffers to hold data and/or to reduce packet loss, and hence impedes the quality.

SUMMARY

In one or more non-limiting example embodiments, a decision to perform a handover is made either by a mobile station or a serving base station. Generally, a radio resource set for use by a mobile station to establish a target radio link between the mobile station and a target base station is allocated and provided to the mobile station. Information on the radio resource set is provided to the mobile station piggy-backed onto a handover response message or piggy-backed onto a handover request message depending on whether the mobile station or the serving base station initiates the handover process. Once the mobile station receives the radio resource set information, a serving radio link between the mobile station and the serving base station can be broken and the target radio link between the mobile station and the target base station can be established using the radio resource set.

In an embodiment, allocating the radio resource set involves the serving base station sending an alert message to the target base station regarding the impending handover. The alert message is sent over a network backbone, which can be any combination of wired and/or wireless communications medium.

The target base station, upon receipt of the alert message, allocates the radio resource set for the mobile station. Preferably, the radio resource set is a non-contentious uplink resource set reserved for the mobile station, i.e., no other mobile station will contend for the same resource set. The non-contentious uplink resource set can define, among others, a particular uplink time slot and can further define a ranging code, a frequency carrier channel, a sub-channel, and a frame number to be used during the uplink access. The target base station then sends an alert response message to the serving base station. The alert response message, onto which the radio resource set information is piggy-backed, can also be sent over the network backbone.

Upon receipt of the alert response message, the serving base station sends either the handover response message (if the mobile station initiates the handover) or the handover request message (if the serving base station initiates the handover) to the mobile station over the serving radio link with the mobile station. The resource set information is piggy-backed onto the handover response/request message.

The mobile station, upon receipt of the handover response/request message, sends a handover indication message to the serving base station over the serving radio link to indicate that it (the mobile station) is ready to execute the handover. At this point, the serving radio link can be broken.

The mobile station also sends a ranging request message to the target base station over a radio interface using the radio resource set allocated earlier by the target base station. The target base station responds by sending a ranging response message to the mobile station also over the radio interface. In the ranging response message, the target base station may include a timing offset, among other parameters in the response message. The mobile station adjusts its radio transmission parameters according to the parameters included in the response message.

The target base station then allocates the DL control channel for CQICH and the mobile station acknowledges this and the data link between the mobile station and the target base station is established. Afterwards, data can be exchanged between the mobile station and the target base station over the target radio link. The handover indication message and the ranging request message can be sent in any order.

In other non-limiting example embodiments, the mobile station currently can be in a common serving radio link with plural serving base stations and a handover to establish a common target radio link with plural target base stations can be performed. A non-limiting common radio link example is described as follows. The mobile station can be specified to use a particular time, channel and/or code slot of an uplink data frame to transmit data to the network. The serving base stations are arranged to listen to the specified time, channel and/or code slot of the uplink data frame. That is, the serving base stations are all arranged to listen to the data transmission from the mobile station.

The common radio link allows, for example, spatial diversity schemes to be used to enhance communication reliability between the mobile station and the network. The signaling flow messages (MOB_MSHO-REQ, MOB_BSHO-REQ, MOB_HO-IND, RNG-REQ, RNG-RES, etc.) can be exchanged between the mobile station and an anchor service base station and between the mobile station and an anchor target base station. The anchor service base station and the anchor target base station are, respectively, one of the serving base stations and one of the target base stations.

In the non-limiting example embodiments, some of the signaling flow is shifted from the interruption time to the preparation time. As a result, the interruption time is considerably reduced, which has the advantage of reducing latency. In addition, the buffering requirement is significantly lessened.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope.

In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 2A:
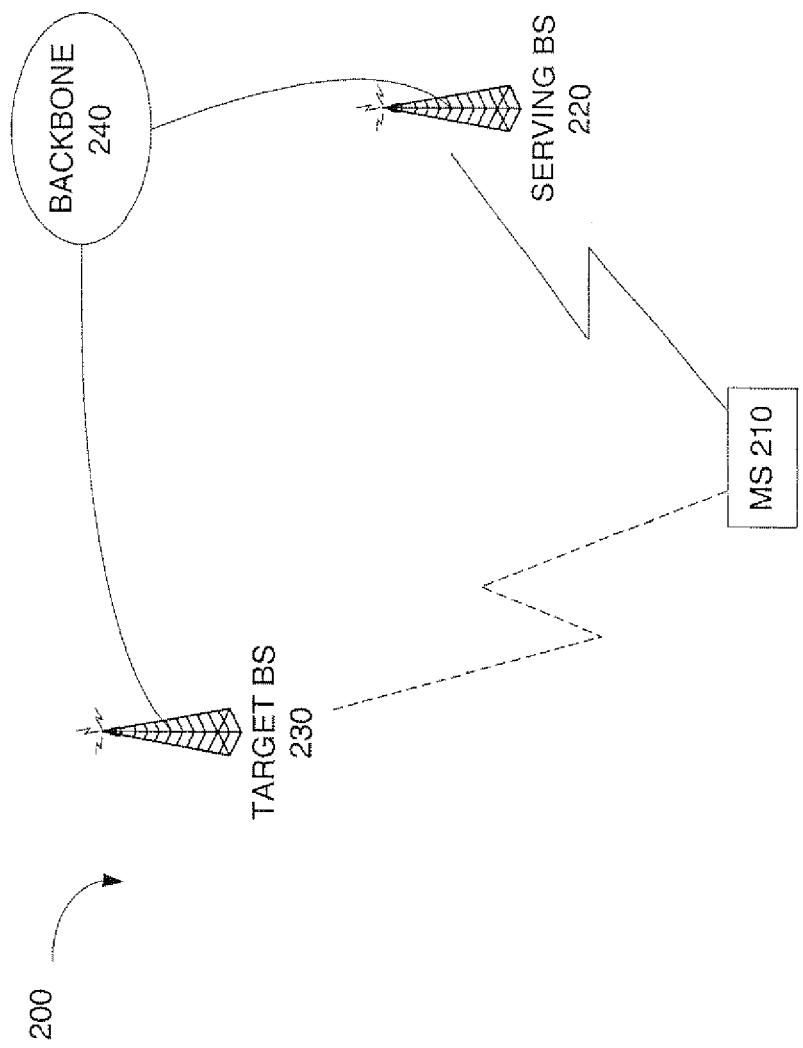
FIG. 2A illustrates an example non-limiting embodiment of a wireless network.

FIG. 2A illustrates an example non-limiting embodiment of a wireless network 200 in which a handover can be performed so that a mobile station 210 that is in a radio link with a serving base station 220 is broken and a radio link with a target base station 230 is established. For ease of reference, the radio link between the mobile station 210 and the serving base station 220 is referred to as the "serving" radio link and the radio link between the mobile station 210 and the target base station 230 is referred to as the "target" radio link. In FIG. 2A, the serving radio link is represented as a solid line and the target radio link is represented as a dashed line. The network 200 also includes a network backbone 240 that operatively connects the serving base station 220 with the target base station 230. The network backbone 240 can be any combination of wired and/or wireless links such as optical fiber, copper, microwave, satellite, etc.

Figure 2B:
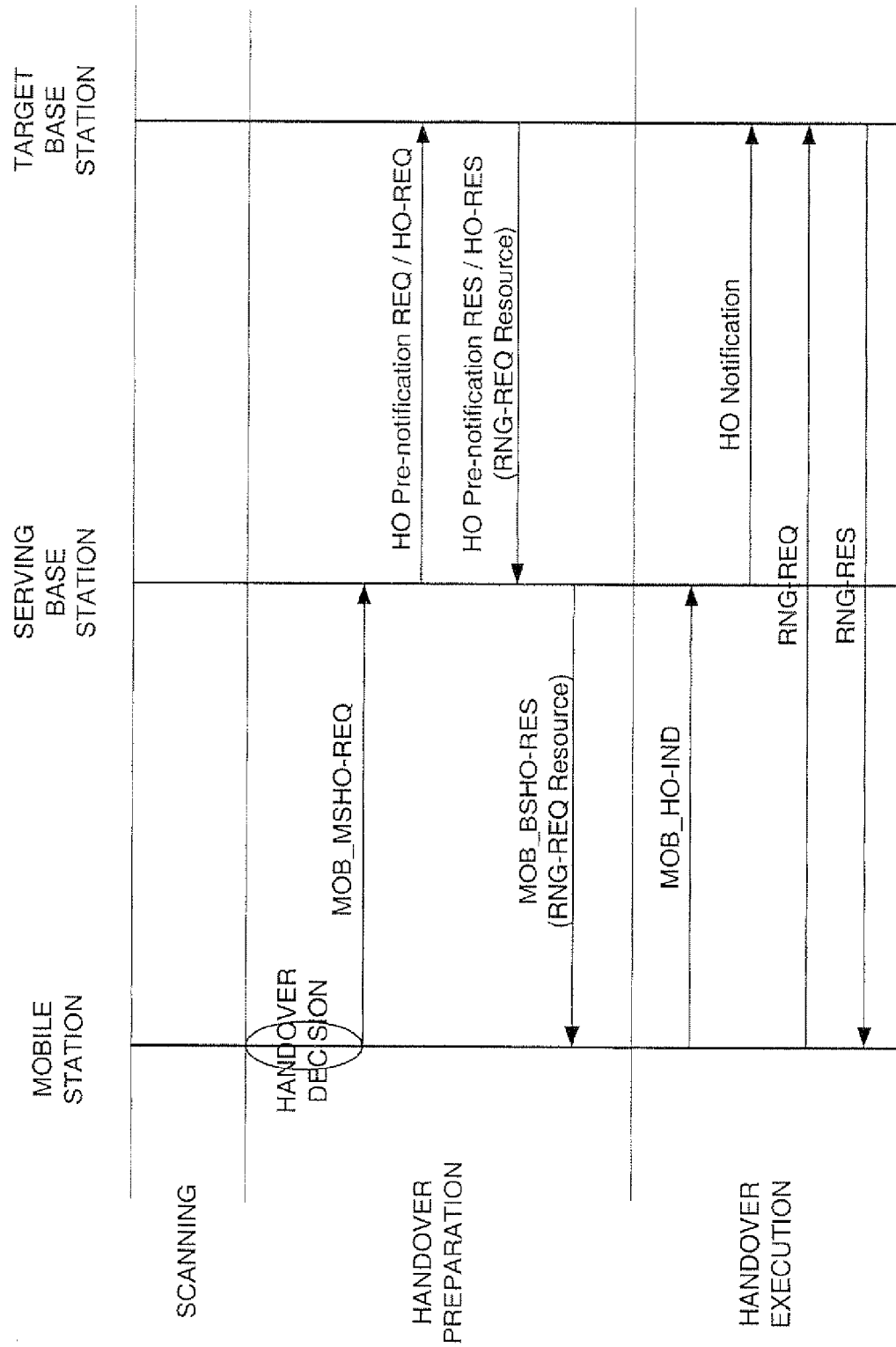
FIGS. 2B and 2C illustrate example non-limiting signaling flows when hard handovers are performed.

FIG. 2B illustrates an example non-limiting signaling flow when the mobile station 210 initiates the hard handover by sending a mobile station initiated handover request (MOB_MSHO-REQ) message to the serving base station 220. The handover request can be sent over the serving radio link. The serving base station 220 in turn alerts the target base station 230 of the impending handover by sending an alert (HO Pre-notification REQ/HO-REQ) message to the target base station 230. The alert message can be sent over the backbone 240.

In an embodiment, the target base station 230 can selected from multiple potential target base stations. Where there are multiple potential target base station to which a handover can be performed, the serving base station 220 sends the alert message to each potential target base station. The alert message can be sent as a multicast message or as individual messages.

Each potential target base station including the ultimately selected target base station 230, upon receiving the alert message, allocates a radio resource set for the mobile station 210 to use in establishing the target radio link. Preferably, the radio resource set is a non-contentious uplink resource set reserved for the mobile station 210, i.e., no other mobile station will contend for the same resource set. The target base station 230 then sends an alert response (HO Pre-notification RES/HO-RES) message to the serving base station 220. The alert response message can also be sent over the network backbone 240. In the alert response message, the target base station 230 includes information on the radio resource set allocated for the mobile station 210. The radio resource set information can be piggy-backed, i.e., made a part of, the alert response message.

The piggy-backing concept is explained with a non-limiting example description. In WiMax, messages including the HO Pre-notification RES/HO-RES, MOB_BSHO-RES and MOB_BSHO-REQ messages (see FIG. 2B) are formed as medium access control (MAC) messages. The MAC messages can include a payload and the size of the payload can be specified dynamically for individual MAC messages. In one embodiment, the radio resource set is made a part of the MAC message payload, i.e., is piggy-backed onto the MAC message. For example, the HO Pre-notification RES/HO-RES message sent to the serving base station 220 from the target base station 230 may include the radio resource set information in the payload portion of the message. In one embodiment, a format of the alert response (HO Pre-notification RES/HO-RES) message includes a piggyback indicator, which can be implemented as a single bit, to indicate whether there is piggy-backed message or not in the alert response message.

Upon receipt of the alert response message, the serving base station 230 responds to the mobile station 210 by sending a handover response (MOB_BSHO-RES) message to the mobile station 210. The handover response message can be sent over the serving radio link, and can include the radio resource set information piggy-backed thereon for all potential target base stations, including the selected target base station 230, that responded to the alert message from the serving base station 220. Similar to the alert response message, a format of the handover response (MOB_BSHO-RES) message can also include a piggyback indicator, again which can be implemented as a single bit, to indicate whether there is piggy-backed message or not in the handover response message.

The mobile station 210 acknowledges the handover response message by sending a handover indication (MOB_HO-IND) message to the serving base station 220, which can also be over the serving radio interface. The handover indication message marks the ending of the handover preparation phase and the beginning of the handover execution phase.

The contents of the handover indication message indicates whether the mobile station 210 is ready to proceed with the handover execution or wishes to cancel the handover. If the handover indication message indicates that the mobile station 210 is ready to proceed, the serving radio link can be broken. The serving base station 220 notifies the target base station 230 that the handover execution is initiated by sending a handover notification (HO Notification/HO-Cnf) message to the target base station 230.

Figure 1A:
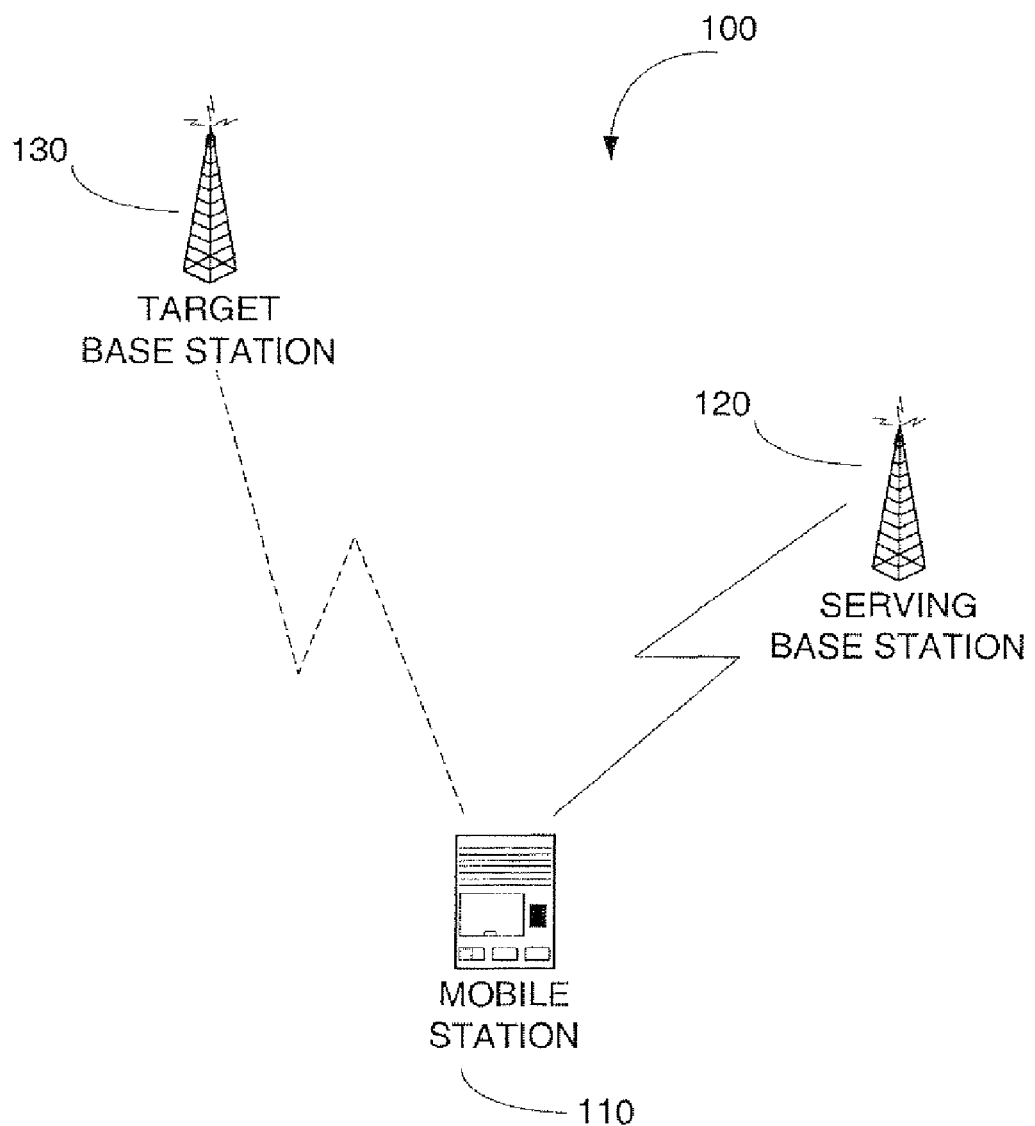
FIG. 1A illustrates a conventional wireless network configuration in which a conventional handover is performed.
Figure 1B:
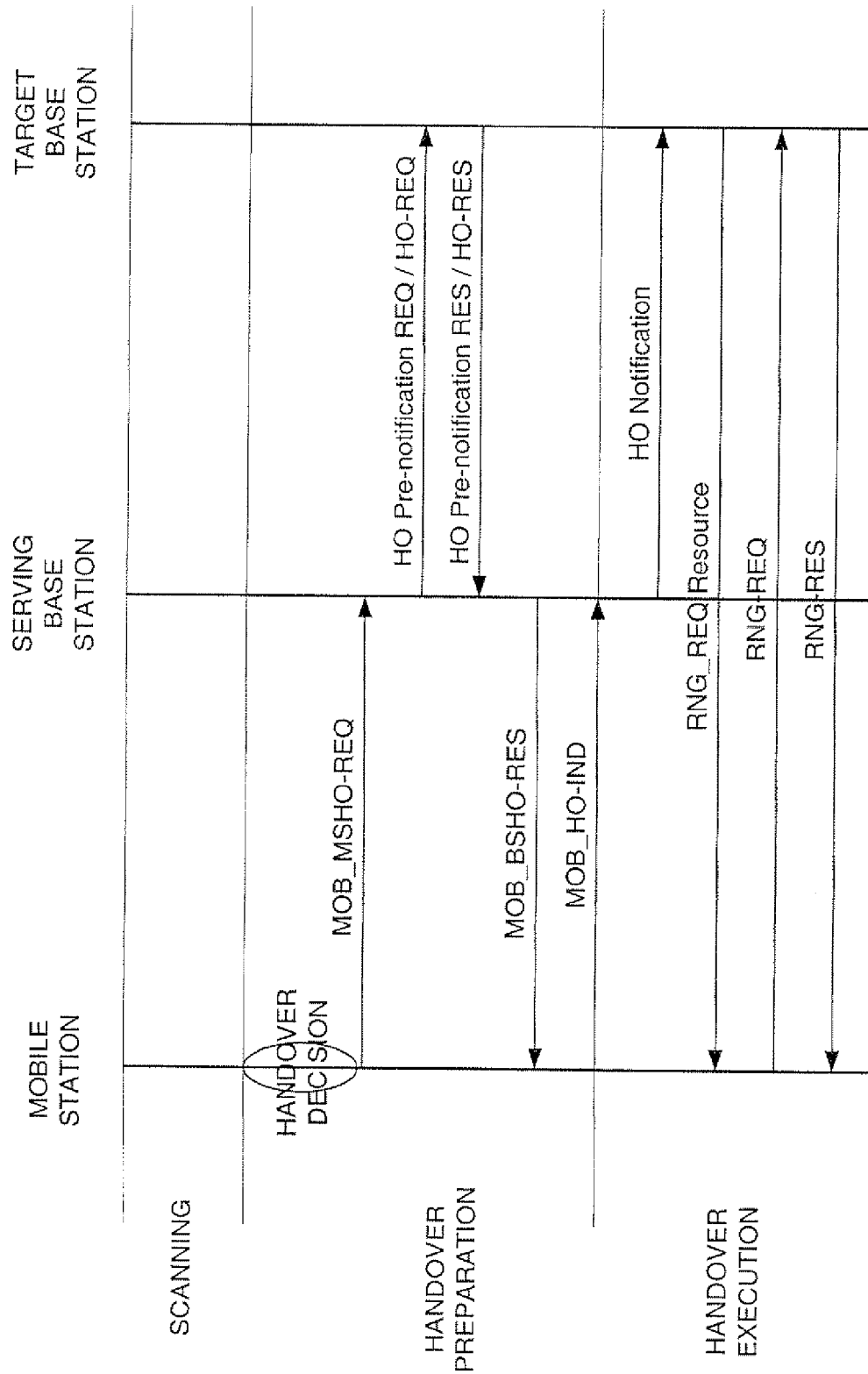
FIGS. 1B and 1C illustrate conventional signaling flows when hard handovers are performed.
Figure 1C:
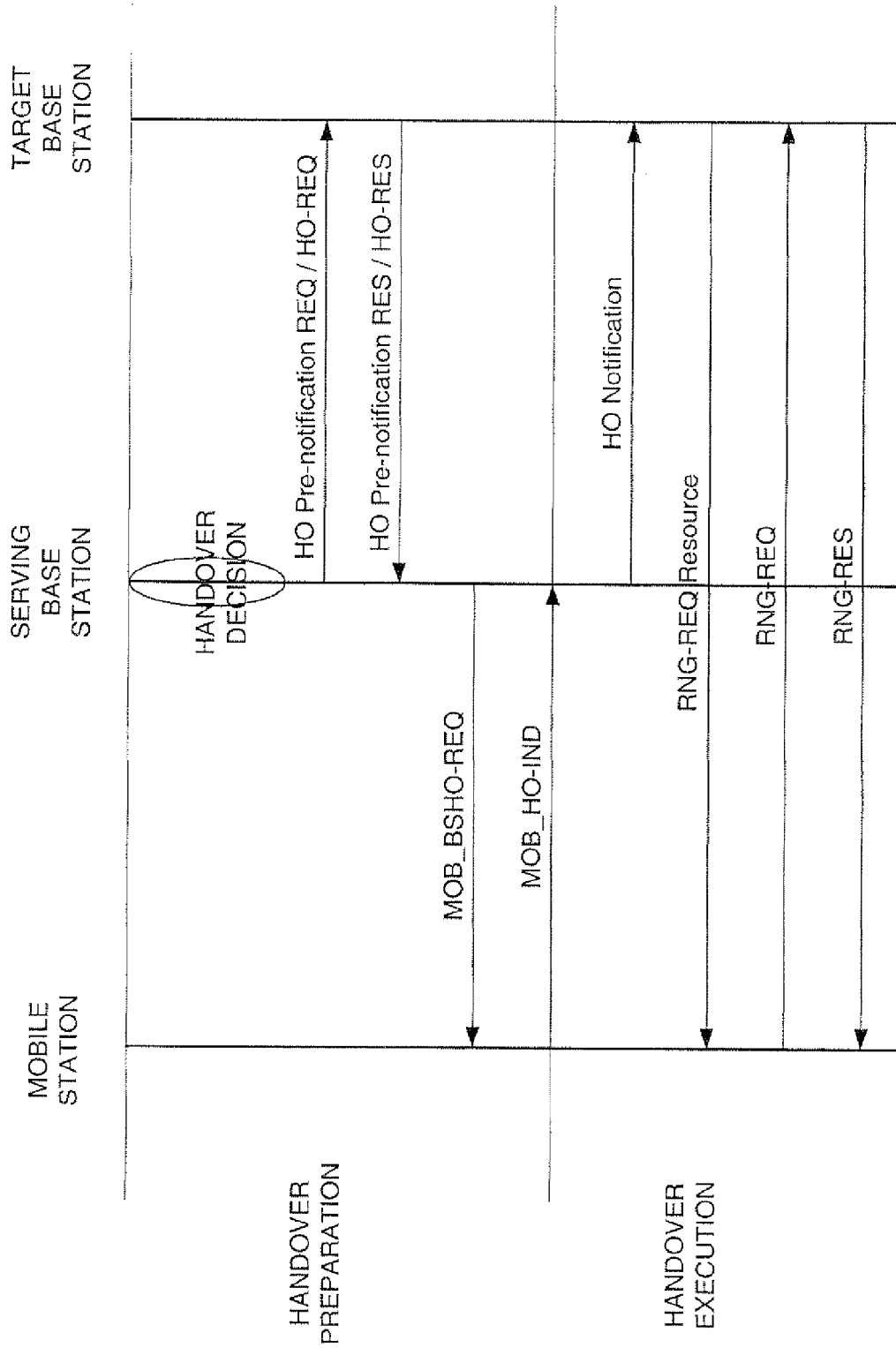

Compared to the conventional handover process illustrated in FIG. 1B, some of the signaling flow messages are shifted from the interruption time to the preparation time in FIG. 2B. As an example, the allocation for the radio resource set is performed during the handover preparation phase rather than during the handover execution phase, and the allocated radio resource set is made available to the mobile station 210 also during the handover preparation phase.

In addition to sending the handover indication message to the serving base station 220, the mobile station 210 sends a ranging request (RNG-REQ) message to the target base station 230 using the radio resource set over a radio interface that is listened to by the target base station 230. In an embodiment, the mobile station 210 selects the target base station 230, from among the potential target base stations prior to sending the ranging request. Note that the mobile station 210 does not have to wait for the radio resource set for the target base station 230 to be allocated after breaking the serving radio link since the radio resource set has already been allocated earlier during the handover preparation phase. Also, if the radio resource set is a non-contentious uplink resource set, the handover process will be accomplished that much sooner since only the mobile station 210 is allowed to use the radio resource set.

FIG. 2B shows that the handover indication message precedes the ranging request message, which allows for further reduction in handover interruption time. It should be noted however that the mobile station 210 can send the handover indication and the ranging request messages in either order or even substantially simultaneously.

The target base station 230, upon receipt of the ranging request message, determines the transmission profile (which includes timing offset information among others) for the mobile station 210. The target base station 230 sends the transmission profile as a part of a ranging response (RNG-RES) message to the mobile station 210, which can be provided over the radio interface. Upon receipt of the ranging response message, the mobile station 210 adjusts its local transmission parameters including timing and power level. At this point, the target radio link is established and the target base station 230 may allocate a control channel to the mobile station to report the CQI channel quality. Afterwards, data is exchanged over the target radio link completing the handover. The target base station 230 becomes the new serving base station after the handover is completed.

This shifting of the signaling flow from the interruption time to the preparation time results in a considerable reduction of the interruption time, and additionally results in lessening the requirement for buffering the data packets for the mobile and the base stations. The shifted signaling flow messages can be transported as piggy-backed messages over the backbone 240 as well as over the serving radio link. In so doing, the interruption time is greatly reduced, as small as two to four frames (10 to 20 ms), and hence the total roundtrip time is reduced.

Figure 2C:
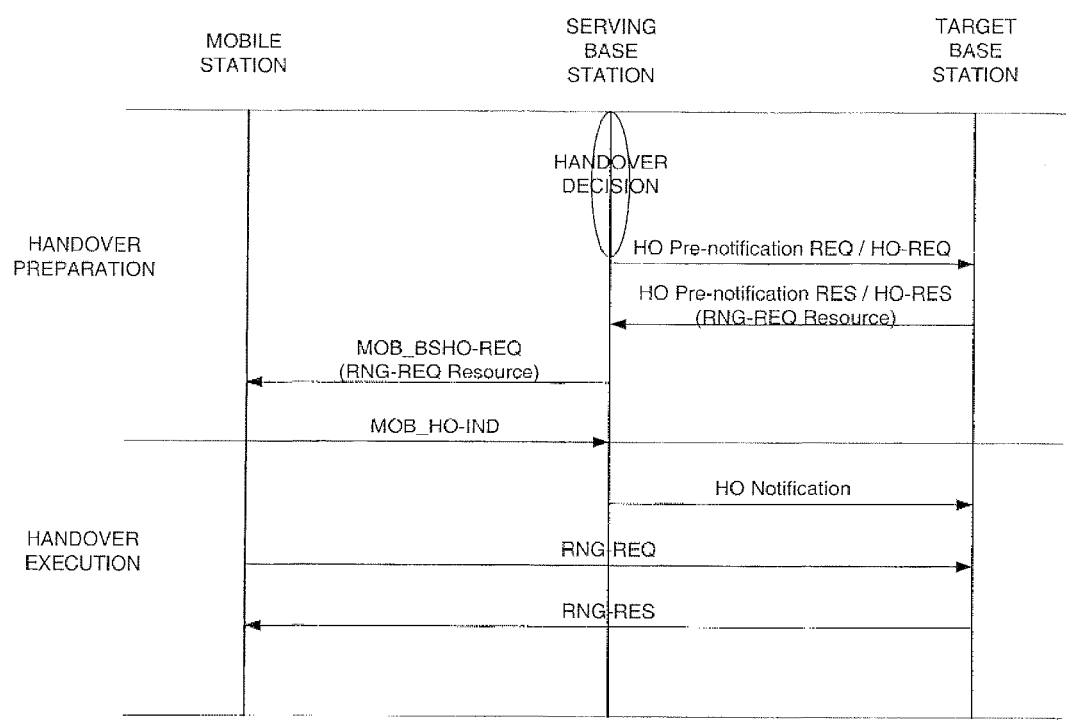

FIG. 2C illustrates another example non-limiting signaling flow when a hard handover is performed. FIG. 2C differs from FIG. 2B in that the handover is initiated by the serving base station 220 by sending the alert message to the target base station 230. After receiving the alert response message, the serving base station 220 sends a base station initiated handover request (MOB_BSHO-REQ) message to the mobile station 210 over the serving radio link. The radio resource set information for all potential target base stations can be piggy-backed on to the handover request message. The presence of the piggy-backed message can be indicated through the piggy-back indicator. The remainder of the signaling flows are similar to the signaling flows as illustrated in FIG. 2B.

Again, it is to be noted that the target base station 230 can be one of plural potential target base stations. Where there are plural potential target base station to which a handover can be performed, the serving base station 220 sends the alert message to each potential target base station and correspondingly receives the alert response message from each potential target base station.

Figure 2D:
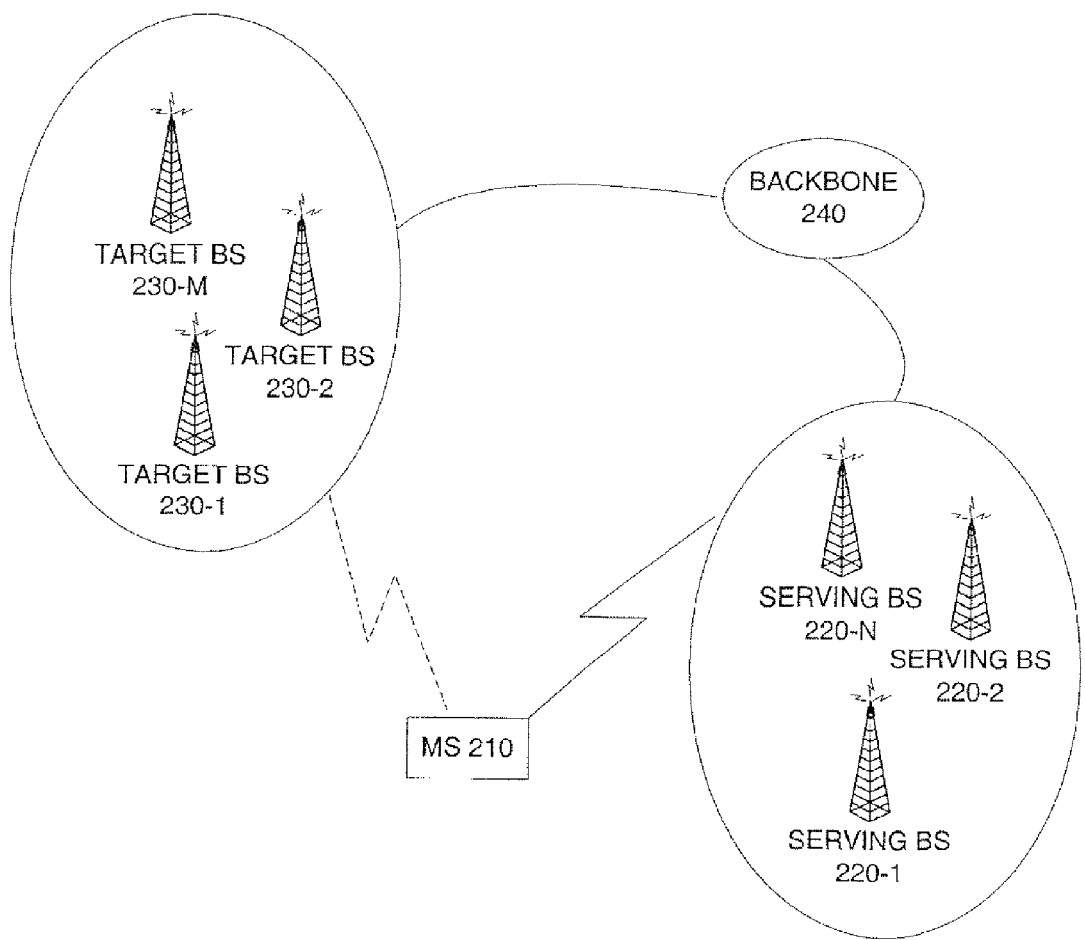
FIG. 2D illustrates another example non-limiting embodiment of a wireless network.

For simplicity, FIG. 2A illustrates a single mobile station 210, a single serving base station 220 and a single target base station 230. However, it is contemplated that the mobile station 210 can be in a common serving radio link with a plurality of serving base stations 220-1, 220-2 . . . 220-N and the handover be performed so that a common target radio link with plural target base stations 230-1, 230-2 . . . 230-M is established as illustrated in FIG. 2D.

For ease of coordination, the signaling flows can be conducted between the mobile station 210 and one of the serving base stations 220—an anchor serving base station 220-1. Similarly, signaling flows can be conducted between the mobile station 210 and one of the target base stations 230—an anchor target base station 230-1. Note that a number of serving base stations 220 and a number of target base stations 230 need not be the same. Also, while both plural serving and target base stations are illustrated in FIG. 2D, it is fully contemplated that handover can occur from a single serving base station to plural target base stations and from plural serving base stations to a single target base station.

Figure 3A:
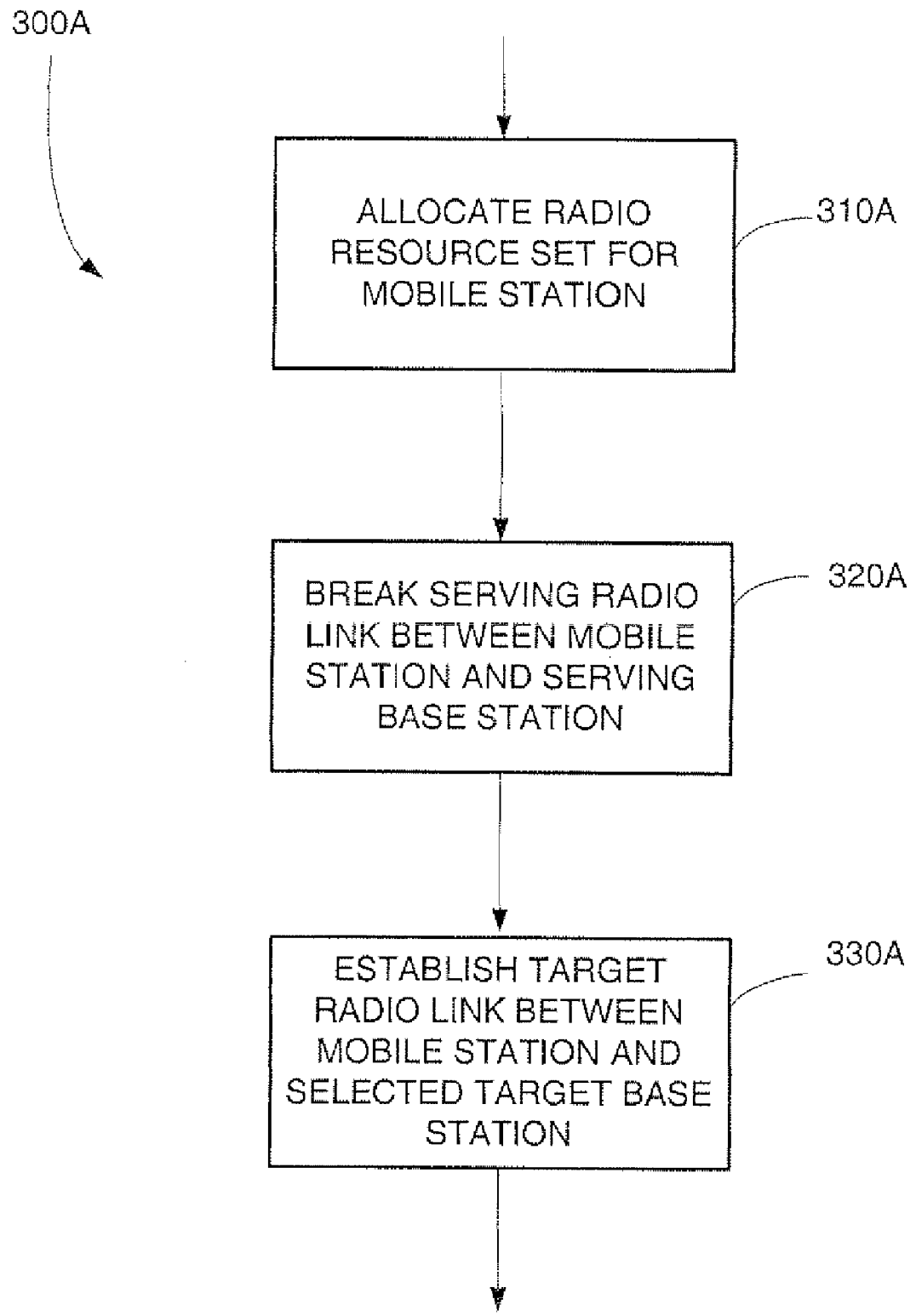
FIGS. 3A and 3B illustrate example non-limiting flowcharts of methods to perform the handover.

FIG. 3A illustrates an example non-limiting flowchart of a method to perform the handover. The handover can be initiated by either the mobile station or the serving base station. In act 310A, the radio resource set is allocated for the mobile station. The allocated radio resource set is for use by the mobile station to establish the target radio link with the target base station. If the mobile station initiates the handover (e.g., through a handover request sent to the serving base station), then information on the allocated radio resource set is provided to the mobile station from the serving base station as a message piggy-backed onto the handover response message. If the serving base station initiates the handover, the radio resource set information is piggy-backed onto the handover request message sent to the mobile station from the serving base station.

In an embodiment, the radio resource set allocated in act 310A is a non-contentious uplink radio resource set specifically reserved for the mobile station such that no other mobile station communicating with the target base station will contend for the same radio resource set. The non-contentious resource is used by the mobile station to perform the ranging process. The non-contentious uplink radio resource set can include an uplink time slot specifically reserved for the mobile station to use during the ranging process. The non-contentious resource set can also includes a frequency carrier (fc) channel, which can vary greatly for a channel bandwidth from 1.25 Mhz upto 20 or even 40 MHz. In addition, the non-contentious resource set can include subchannel(s), frame number(s), etc. to be used by the mobile station during the uplink access.

As noted above with respect to FIG. 2B, the target base station can be one of multiple potential target base stations. Where there are multiple potential target base stations, act 310A is performed for each potential target base station. That is, a radio resource set corresponding to each potential target base station can be allocated. Ultimately, only the radio resource set(s) corresponding to the selected target station(s) is(are) used in establishing the target radio link(s). For simplicity and clarity however, FIG. 3A illustrates the process for one target base station.

After the radio resource set is allocated in act 310A, the serving radio link between the mobile station and the serving base station can be broken in act 320A. This frees the link resource so that it can be used by the serving base station to communicate with other mobile stations. In act 330A, the target radio link between the mobile station and the target base station is established using the allocated radio resource set. In an embodiment, acts 320A and 330A occur such that there is period of interruption time. That is, a hard handover is performed. Also in an embodiment, act 310A occurs prior to act 320A—that is, the radio resource set is allocated during the handover preparation phase rather than the handover execution phase, which significantly reduces the interruption time and correspondingly reduces the buffer length to necessary hold the data during the interruption time.

Figure 3B:
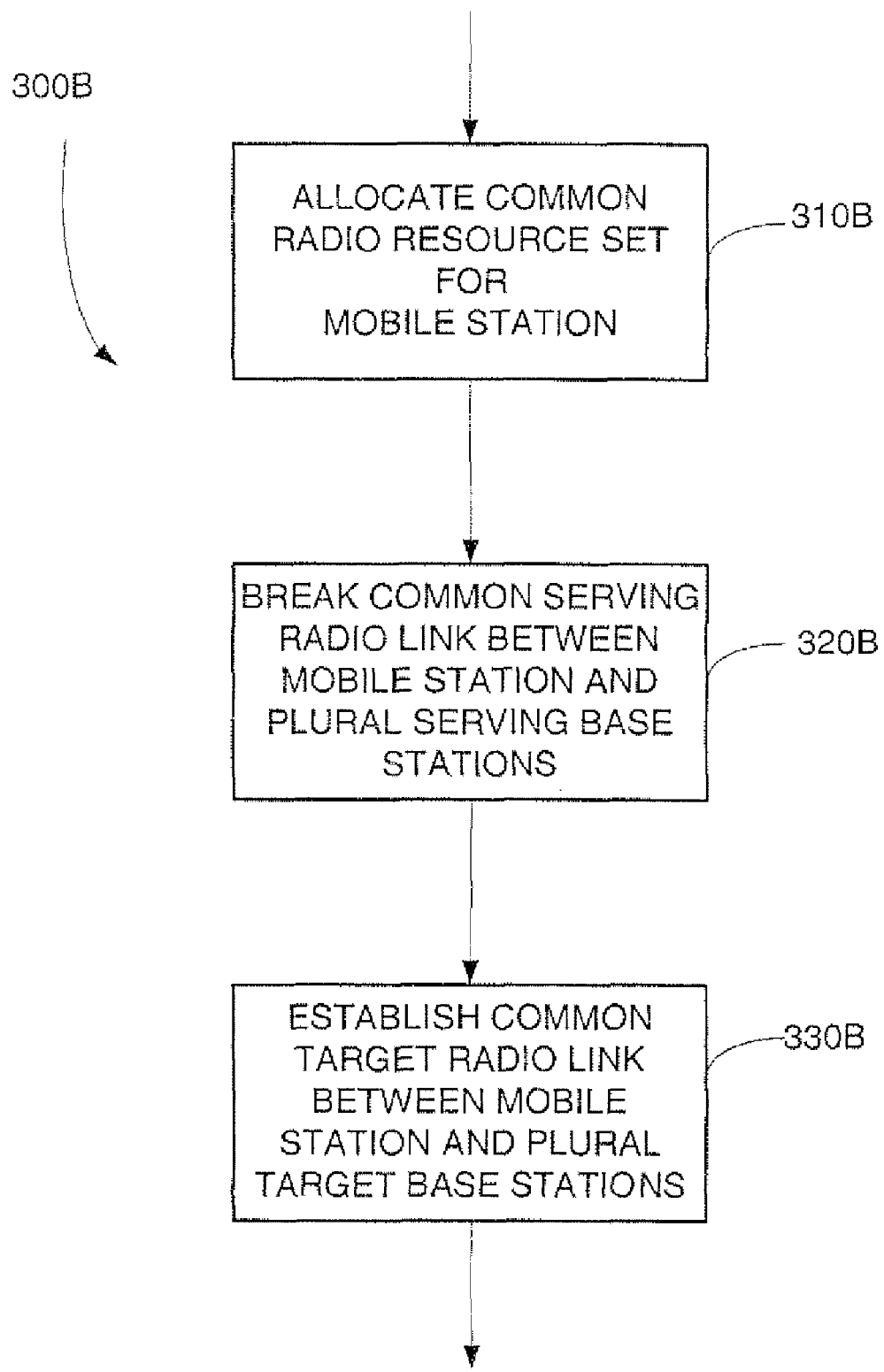

When there are plural serving and/or plural target base stations as illustrated in FIG. 2D, the handover can be performed according to another example non-limiting embodiment as illustrated in FIG. 3B. In act 310B, a common radio resource set is allocated for the mobile station to use in establishing a common target radio link with plural target base stations. The information on the common radio resource set is provided to the mobile station from the serving base station as a message piggy-backed onto the handover response message or to the handover request message depending on whether the mobile station or the serving base station initiates the handover.

In act 320B, a common server radio link between the mobile station and the plural serving base stations is broken. Then in act 330B, the common target radio link between the mobile station and the selected target base stations is established using the allocated common radio resource set. In an embodiment, acts 320B and 330B occur so that there the interruption time is not zero. Also act 310B can occur prior to act 320B.

Figure 4A:
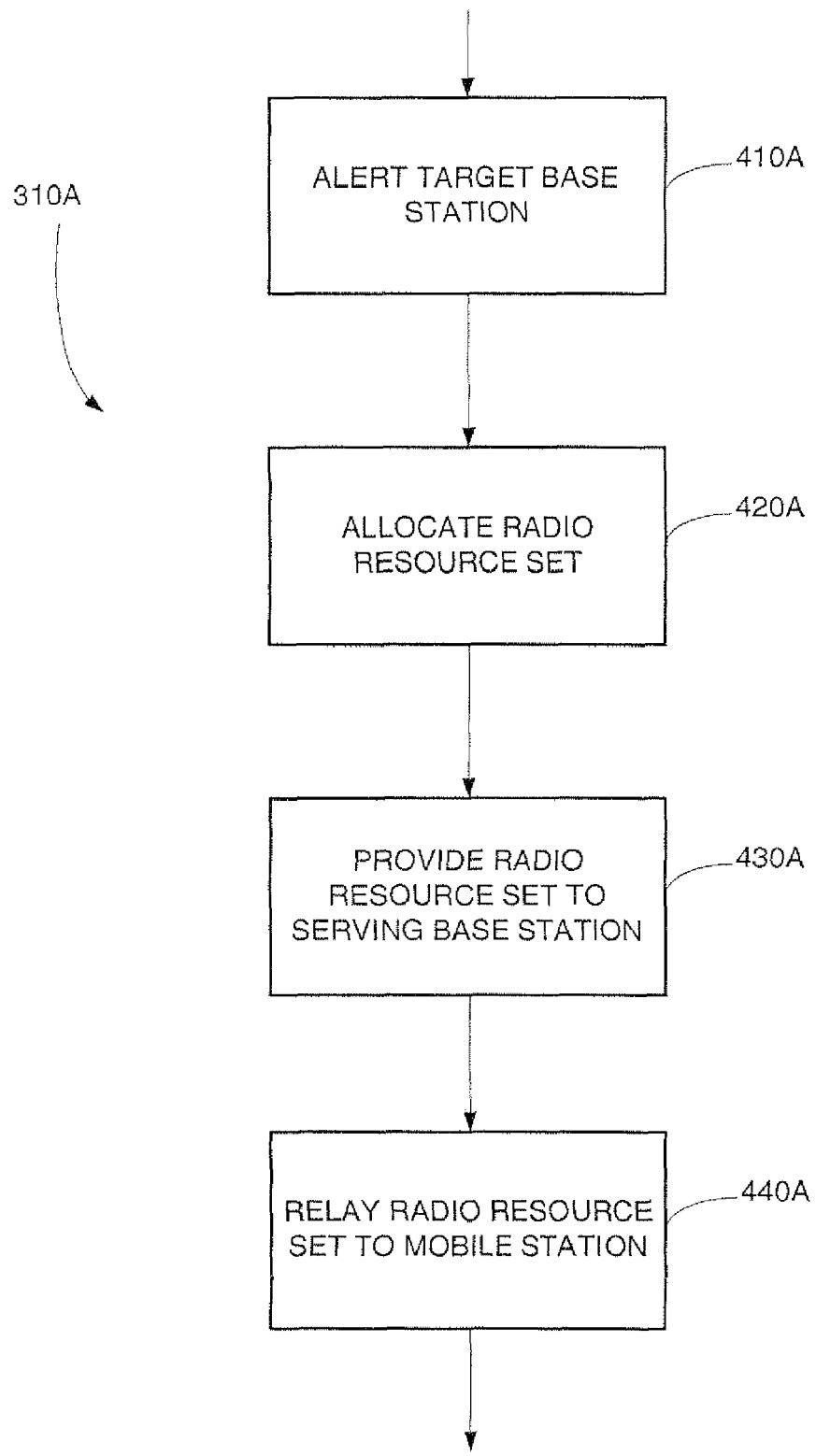
FIGS. 4A and 4B illustrate example non-limiting flowcharts of methods to allocate a radio resource set.

FIG. 4A illustrates an example non-limiting flowchart of a method to allocate the radio resource set (see act 310A in FIG. 3A) for the mobile station. When there are plural potential target base stations, the method as illustrated in FIG. 4A is performed for each potential target base station from which the target base station can be selected. In the method, the target base station is alerted of the handover about to be performed in act 410A. The serving base station can alert the target base station over the network backbone by sending an alert message. Where there are multiple potential target base stations, the alert message may be sent individually to each potential target base station or as a multicast message to the plural potential target base station.

In act 420A, the radio resource set is allocated for the target base station. The target base station itself may allocate the radio resource set. In act 430A, information related to the radio resource set is provided to the serving base station. The target base station can provide the radio resource set information over the backbone by piggy-backing on to an alert response message. In act 440A, the radio resource set information is relayed to the mobile station. The serving base station can relay the radio resource set information over the serving radio link piggy-backed over the handover response message (mobile station initiated handover) or the handover request message (serving base station initiated handover).

Figure 4B:
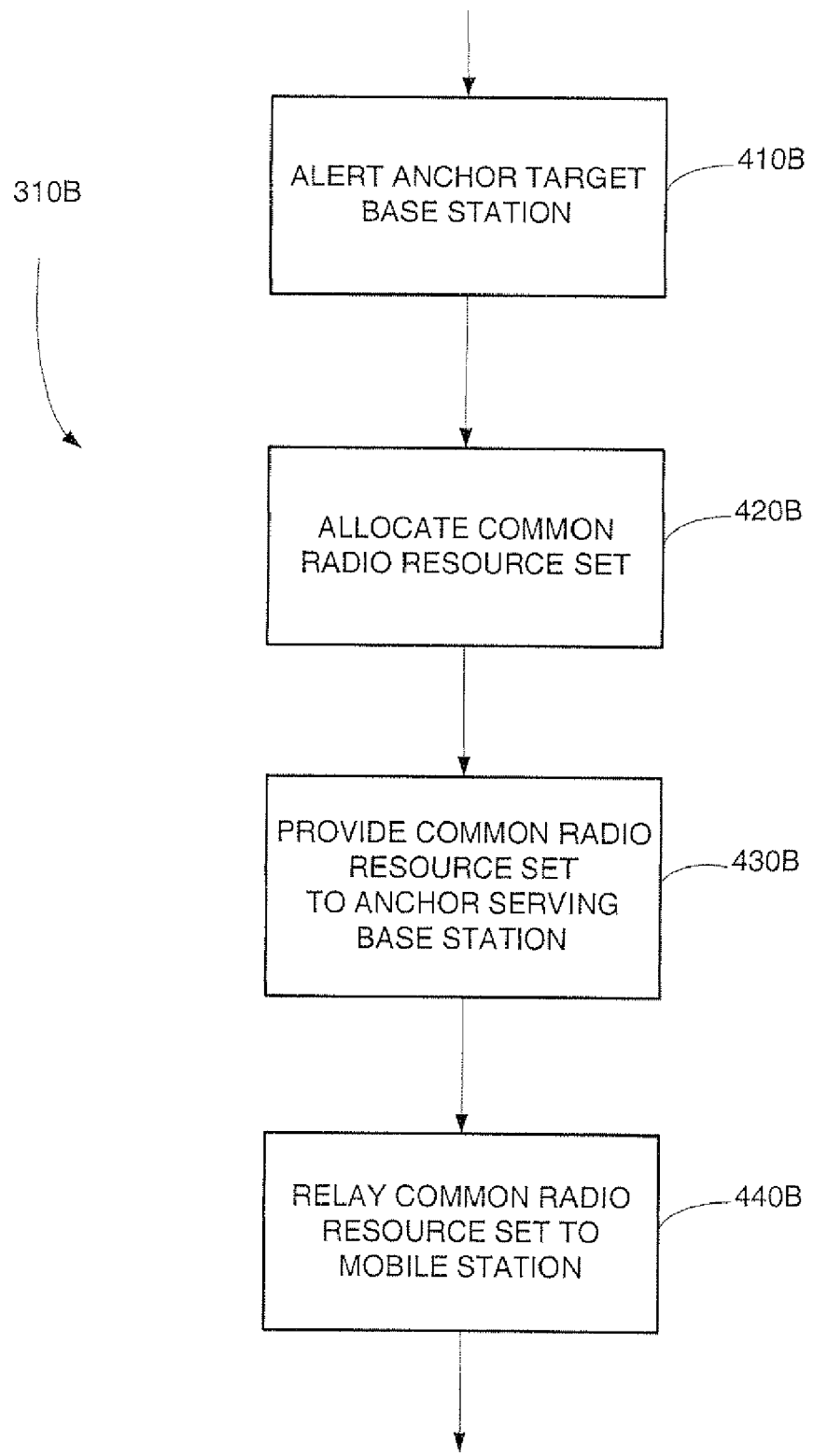

FIG. 4B illustrates an example non-limiting flowchart of a method to allocate the common radio resource set (see act 320B in FIG. 3B) when there are plural serving base stations and/or plural target base stations. In this method, an anchor target base station is alerted of the handover about to be performed in act 410B. In act 420B, the common radio resource set is allocated, and in act 430B, the common radio resource set is provided to the anchor serving base station piggy-backed onto the alert response message. In act 440B, the common radio resource set is relayed to the mobile station piggybacked on to the handover response/request message.

Figure 5A:
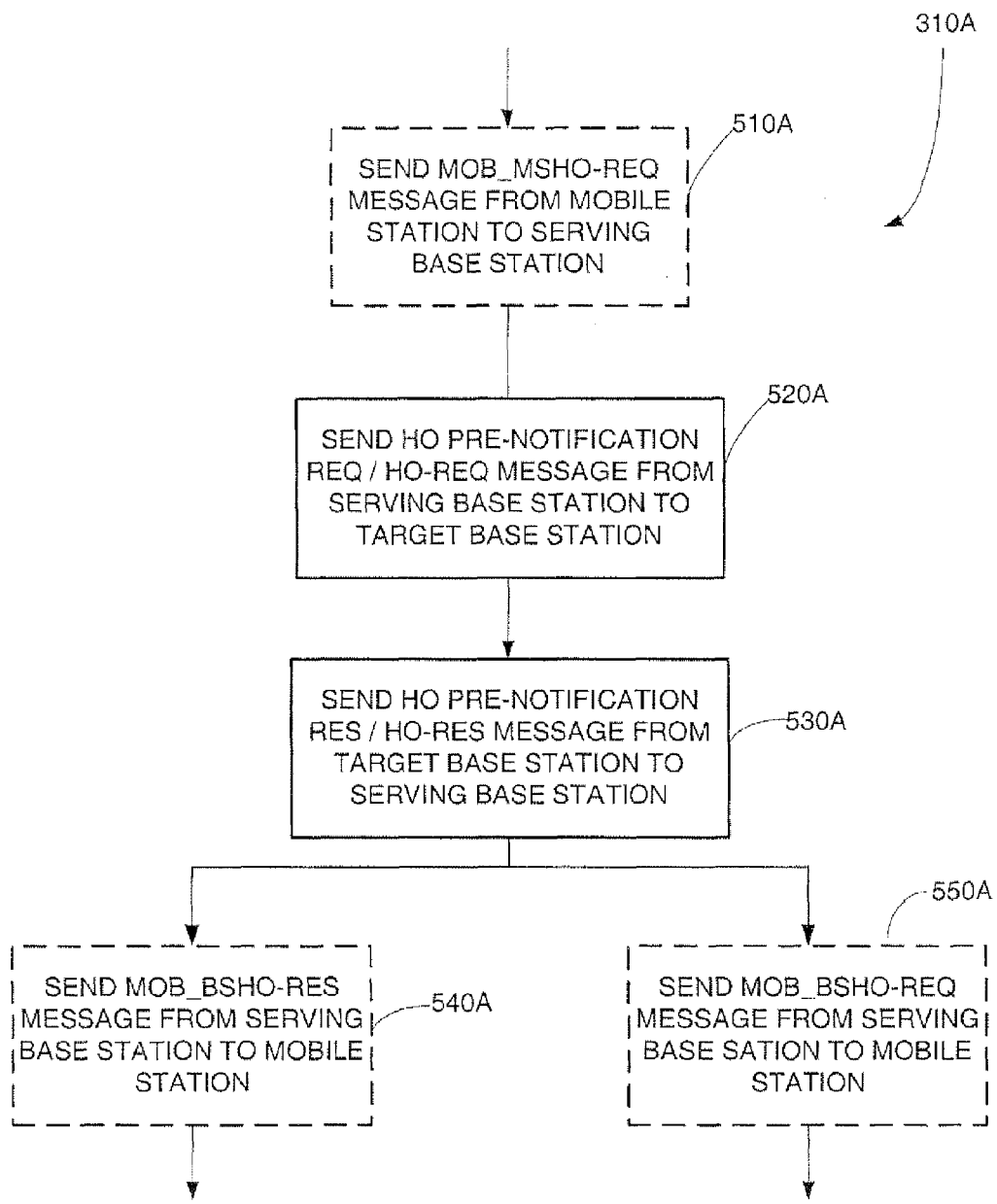
FIGS. 5A and 5B illustrate example non-limiting flowcharts of methods to allocate a radio resource set within a WiMax setting.

FIG. 5A illustrates an example non-limiting flowchart of a method to allocate the radio resource set in the context of WiMax systems. If the handover is initiated by the mobile station, the mobile station sends the MOB_MSHO-REQ message to the serving base station in act 510A and the method proceeds to act 520A. The MOB_MSHO-REQ message can be sent over the serving radio link. If the serving base station initiates the process, the method begins at act 520A.

In act 520A, the serving base station sends the HO Pre-notification REQ/HO-REQ message to the target base station so as to alert the target base station of the handover that is about to be performed. The HO Pre-notification REQ/HO-REQ message can be sent over the network backbone. In response, the target base station sends the HO Pre-notification RES/HO-RES message to the serving base station in act 530A. The HO Pre-notification RES/HO-RES message can also be sent over the network backbone.

In an embodiment, a UL Slot IE (Information Element) included as part of the UL radio resource set, is piggy-backed on to the HO Pre-notification RES/HO-RES message sent from the target base station. Preferably, the UL Slot IE message includes one or more of the following—frame number index n, n+1, UIUC, ranging code, ranging subchannel, UL initial transmit timing, symbol offset, CID field in MAC header, HO_ID, carrier frequency etc. which defines a non-contentious opportunity for the mobile station undergoing the handover to perform the ranging process with target base station. Where there are multiple potential target base stations, acts 520A and 530A are performed for each potential target base station.

The frame numbers identify the frame index in which the mobile station can make the UL access; the UIUC indicates the burst profile to be used; the ranging code is a unique ranging code to be used by mobile station during the UL access to target base station, the ranging subchannel is a subchannel number to be used by the mobile station when making the UL access to target base station; the UL initial transmit time is the start time of UL subframe; the symbol offset is the offset relevant to the UL initial transmit time at which the mobile station make the RNG-REQ; the CID is a CID used MAC header for the RNG-REQ request (initial ranging CID=0000); and HO ID is an identifier assigned to an mobile station for use during initial ranging to the selected target base station.

If the handover is initiated by the mobile station, the serving base station sends the MOB_BSHO-RES message over the serving radio link to the mobile station in act 540A. The UL Slot IE message is piggybacked on to the MOB_BSHO-RES message. On the other hand, if the serving base station initiates the handover, then the serving base station piggybacks the UL Slot IE message on to the MOB_BSHO-REQ message sent to the mobile station over the serving radio link in act 550A. When there are multiple potential target base stations, the UL Slot IE message for all potential target base stations are piggybacked.

Figure 5B:
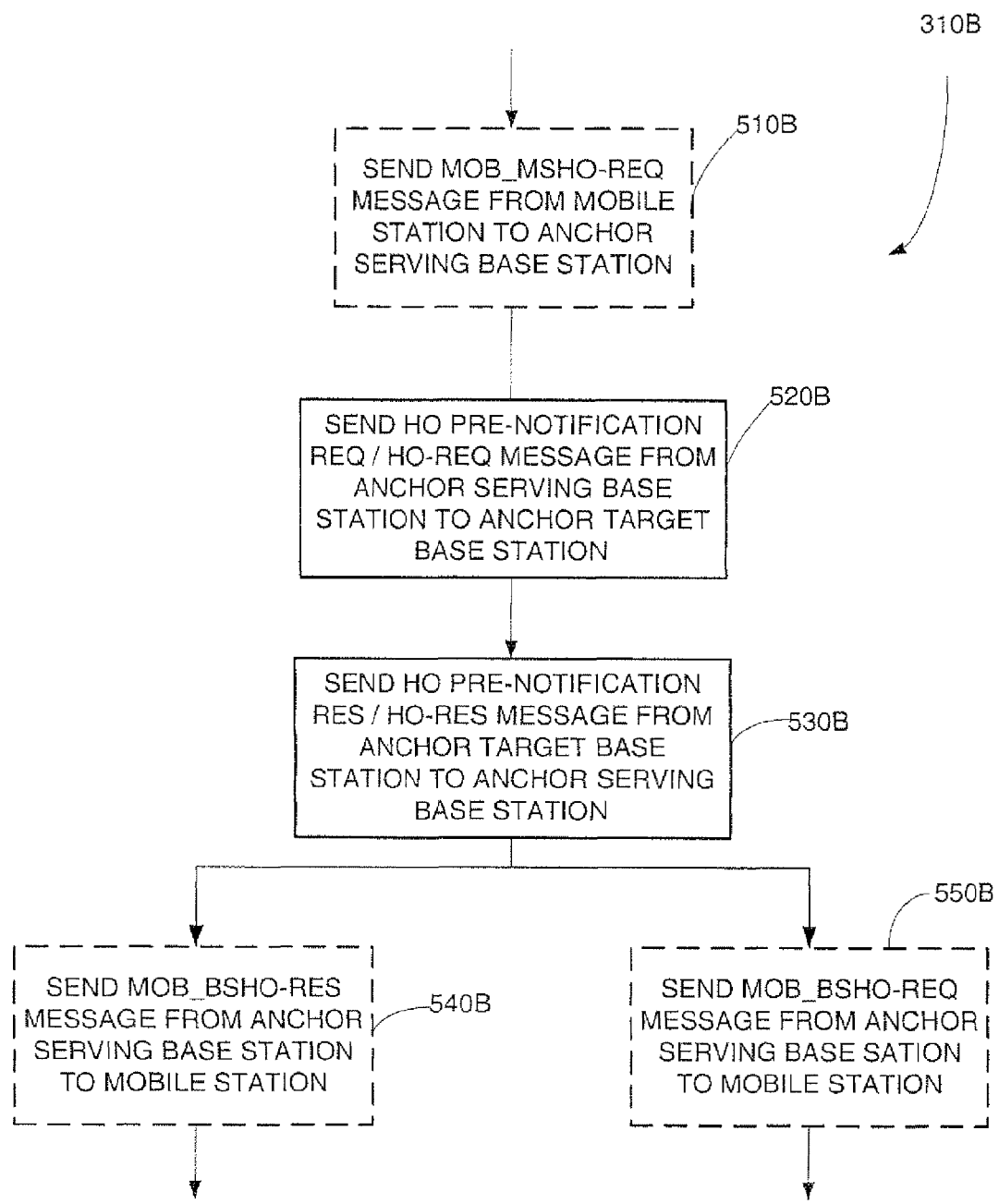

FIG. 5B illustrates another example non-limiting flowchart of a method to allocate the common radio resource set in the context of WiMax systems when there are plural serving base stations and/or plural target base stations. If the handover process is initiated by the mobile station, the mobile station sends the MOB_MSHO-REQ message to the anchor serving base station in act 510B and the method proceeds to act 520B. If the anchor service base station initiates the process, the method begins at act 520B. In act 520B, the anchor serving base station sends the HO Pre-notification REQ/HO-REQ message to the anchor target base station. In response, the anchor target base station sends the HO Pre-notification RES/HO-RES message to the anchor serving base station in act 530B. The UL Slot IE, which includes the radio resource sets for ranging request, can be piggy-backed on to the HO Pre-notification RES/HO-RES message sent to the anchor serving base station.

If the handover is initiated by the mobile station, the anchor serving base station sends the UL Slot IE piggybacked on to the MOB_BSHO-RES message over the common serving radio link in act 540B. If the anchor serving base station initiates the handover, then the anchor serving base station piggybacks the UL Slot E on to the MOB_BSHO-REQ message sent to the mobile station over the common serving radio link.

Figure 6A:
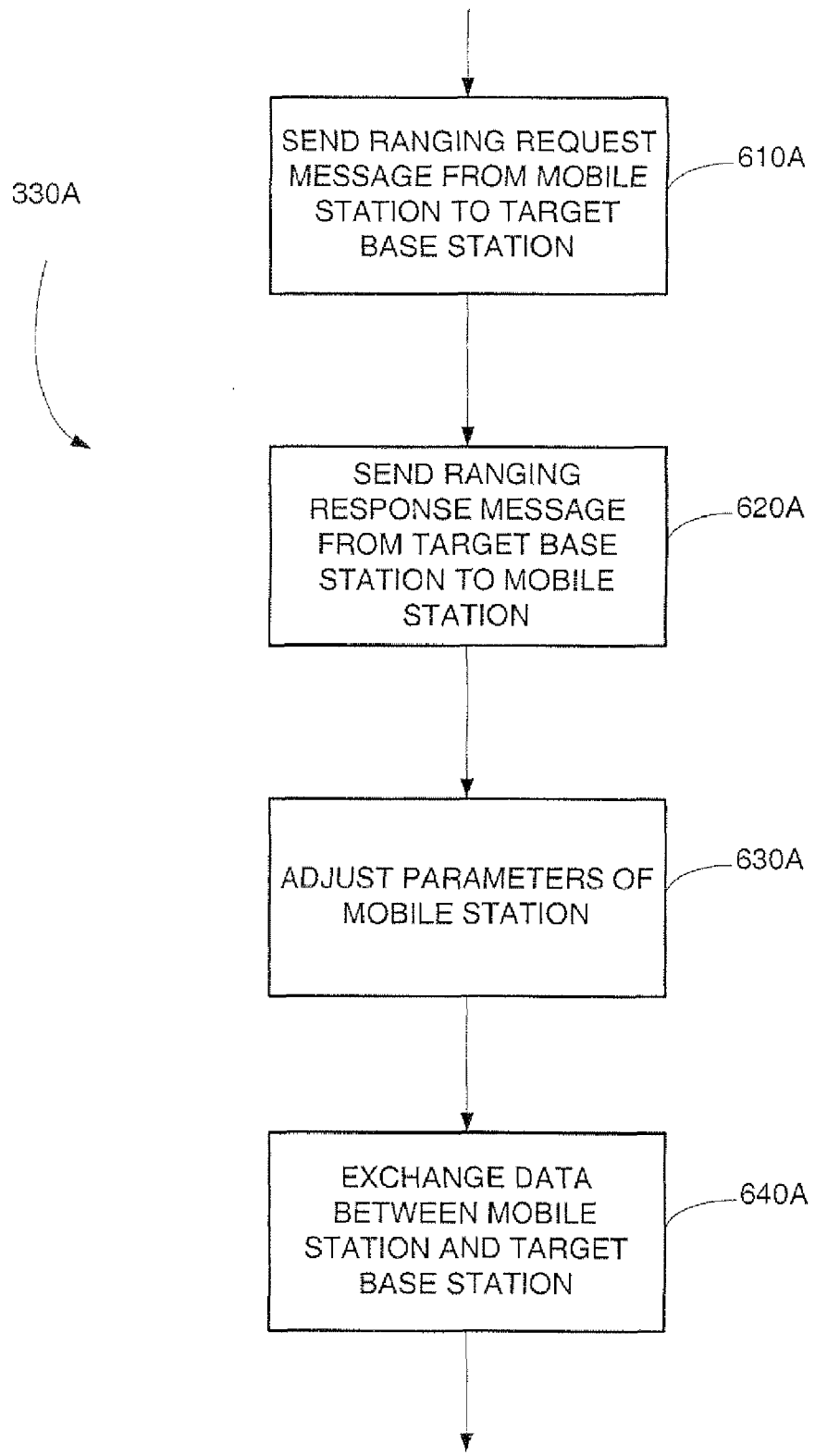
FIGS. 6A and 6B illustrate example non-limiting flowcharts of methods to establish a radio link between the mobile station and the target base station.

FIG. 6A illustrates an example non-limiting flowchart of a method to establish the target radio link between the mobile station and the target base station selected to perform the handover. See step 330A in FIG. 3A. In the method, the mobile station sends a ranging request message to the target base station in act 610A. The ranging request message can include a request for a transmission profile (including timing offset adjustments) for the mobile station to use. In the context of WiMax systems, the RNG-REQ message can be sent by the mobile station to the selected target base station over a radio interface to which the target base station listens. If the UL Slot IE is provided, the mobile station uses the ranging opportunity defined in UL Slot IE to send the RNG-REQ message.

In act 620A, the target base station sends the ranging response message, which includes the timing and power offset for the mobile station over the radio interface. The ranging response message can also include a selected center frequency channel (e.g., 1.25 Mhz, 5 Mhz, 20 Mhz, or 40 Mhz). In act 630A, the mobile station adjusts its transmission parameters based on the transmission profile and the target radio link is established. Then in act 640A, data between the mobile station and the selected target base station can be exchanged based on the adjusted parameters. In the context of the WiMax systems, the ranging response can be in the form of the RNG-RES message.

Figure 6B:
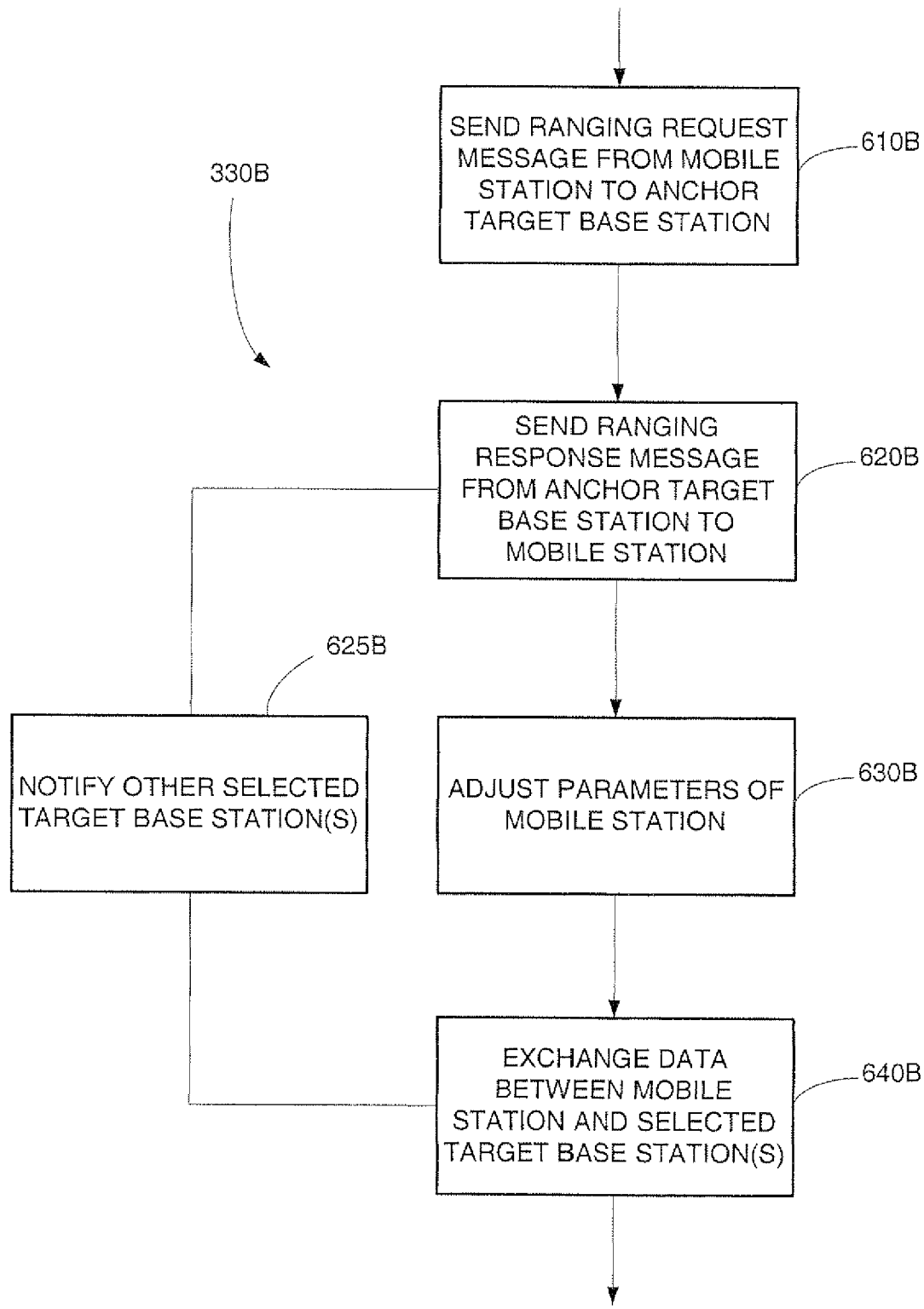

FIG. 6B illustrates another example non-limiting flowchart of a method to establish the common target radio link between the mobile station and plural target base stations. See step 330B in FIG. 3B. In the method, the mobile station sends the ranging request (RNG-REQ) message to the anchor target base station in act 610B, for example, over a radio interface listened to by the anchor target base station. If the UL Slot IE is available, the mobile station uses the ranging opportunity defined in the UL Slot IE to send the RNG-REQ message. In act 620B, the anchor target base station sends the ranging response (RNG-RES) message. In act 630B, the mobile station adjusts its transmission parameters based on the transmission profile included in the ranging response message to establish the common target radio link.

This method also includes act 625B in which other target base station(s) is(are) notified, by the anchor target base station for example, so that the plural target base stations are prepared to exchange data with the mobile station over the common target radio link. Then in act 640B, data between the mobile station and the plural target base stations can be exchanged based on handover completion procedure, that the relevant control channel has been allocated.

Figure 7A:
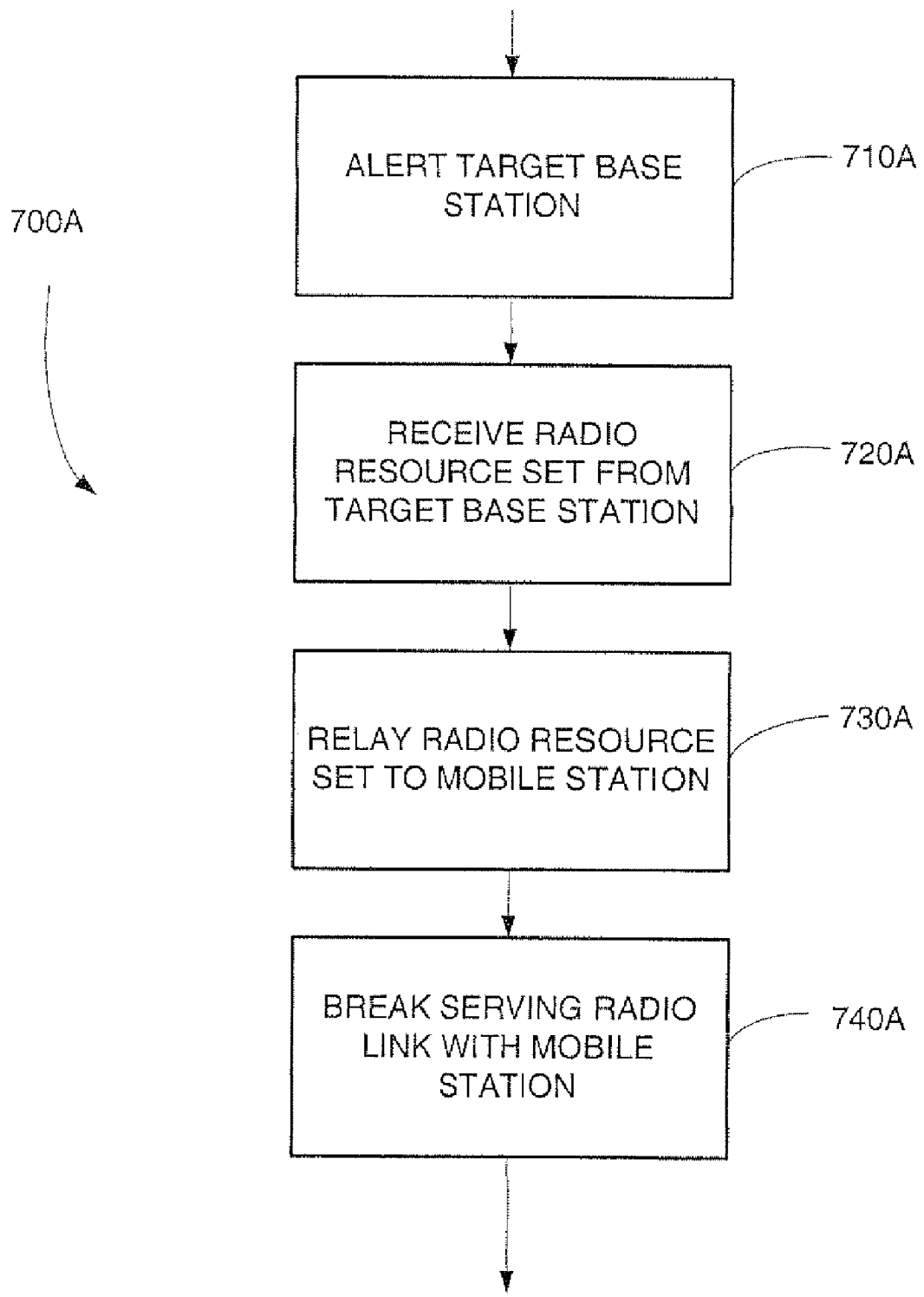
FIGS. 7A and 7B illustrate example non-limiting flowcharts of methods to perform handover from the perspective of the serving base station.

FIG. 7A illustrates an example non-limiting flowchart of a method to perform the handover from the viewpoint of the serving base station. In act 710A, the serving base station alerts the target base station of the handover about to be performed in an alert message. The serving base station can alert the target base station by sending the HO Pre-notification REQ/HO-REQ message over the network backbone. Then in act 720A, the serving base station receives the radio resource set from the target base station piggy-backed onto an alert response message. This can be in the form of the HO Pre-notification RES/HO-RES message with the UL-MAP/UCD/UL Slot IE piggy-backed thereon over the network backbone.

In act 730A, the radio resource set for the target base station is relayed over the serving radio link to the mobile station piggy-backed onto either the handover response or request message depending on whether the mobile station or the serving base station initiates the handover. The UL Slot IE is relayed to the mobile station piggybacked on to the MOB_BSHO-RES message when the mobile station initiates the handover and piggy-backed on to the MOB_BSHO-REQ message when the serving base station initiates the handover. Then in act 740A, the serving radio link with the mobile station is broken, for example, after receiving the MOB_HO-IND message from the mobile station.

Where there are multiple potential target base stations, acts 710A, 720A and 730A are performed for each potential target base station. The potential target base station(s) can be determined either by the mobile station or the serving base station (more on this below) and the target base station is selected from the potential target base station(s).

Figure 7B:
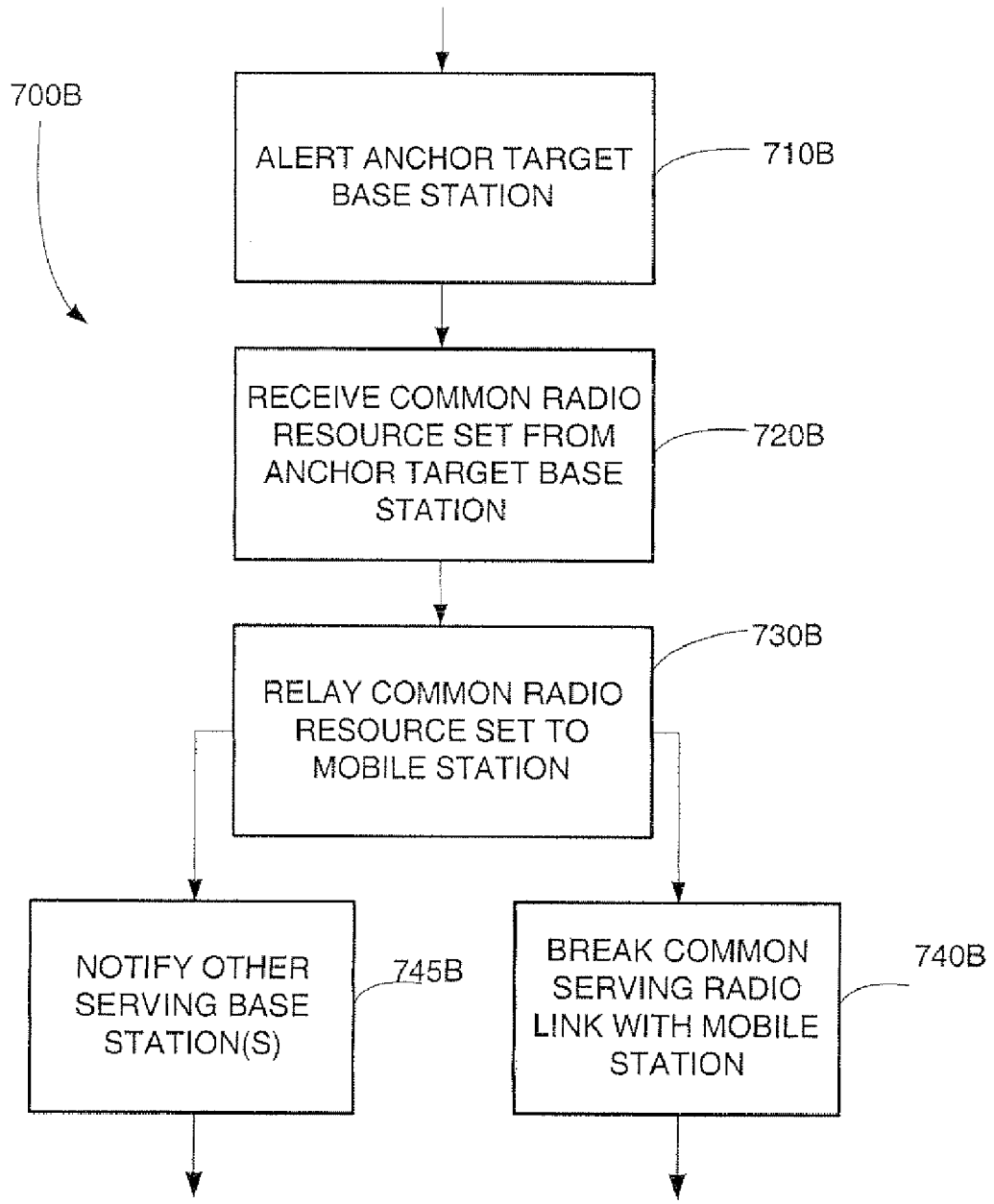

FIG. 7B illustrates another example non-limiting flowchart of a method to perform handover from the perspective of the serving base station when the handover is to plural target base stations. That is, in the handover, a common target radio link is established between the mobile station and the plural target base stations. The method illustrated in FIG. 7B can be a handover from either single serving base station (dedicated link to common link) or from plural serving base station (common link to common link). If the handover is from plural serving base stations, then the serving base station can be assumed to be the anchor serving base station.

In act 710B, the serving base station alerts the anchor target base station of the handover about to be performed. Then in act 720B, the serving base station receives the common radio resource set information from the anchor target base station, for example, as the UL-MAP/UCD/UL Slot IE piggy-backed on to the HO Pre-notification RES/HO-RES message over the network backbone. In act 730B, the common radio resource set is relayed over the serving radio link to the mobile station. The UL Slot IE is relayed to the mobile station piggy-backed on to the MOB_BSHO-RES or the MOB_BSHO-REQ message depending on whether the mobile station or the serving base station initiates the handover. Then in act 740B, the serving radio link with the mobile station is broken. If there are other serving base station(s), these other serving base station(s) is(are) notified in act 745B so that the common serving radio link with the mobile station can be broken.

Figure 8A:
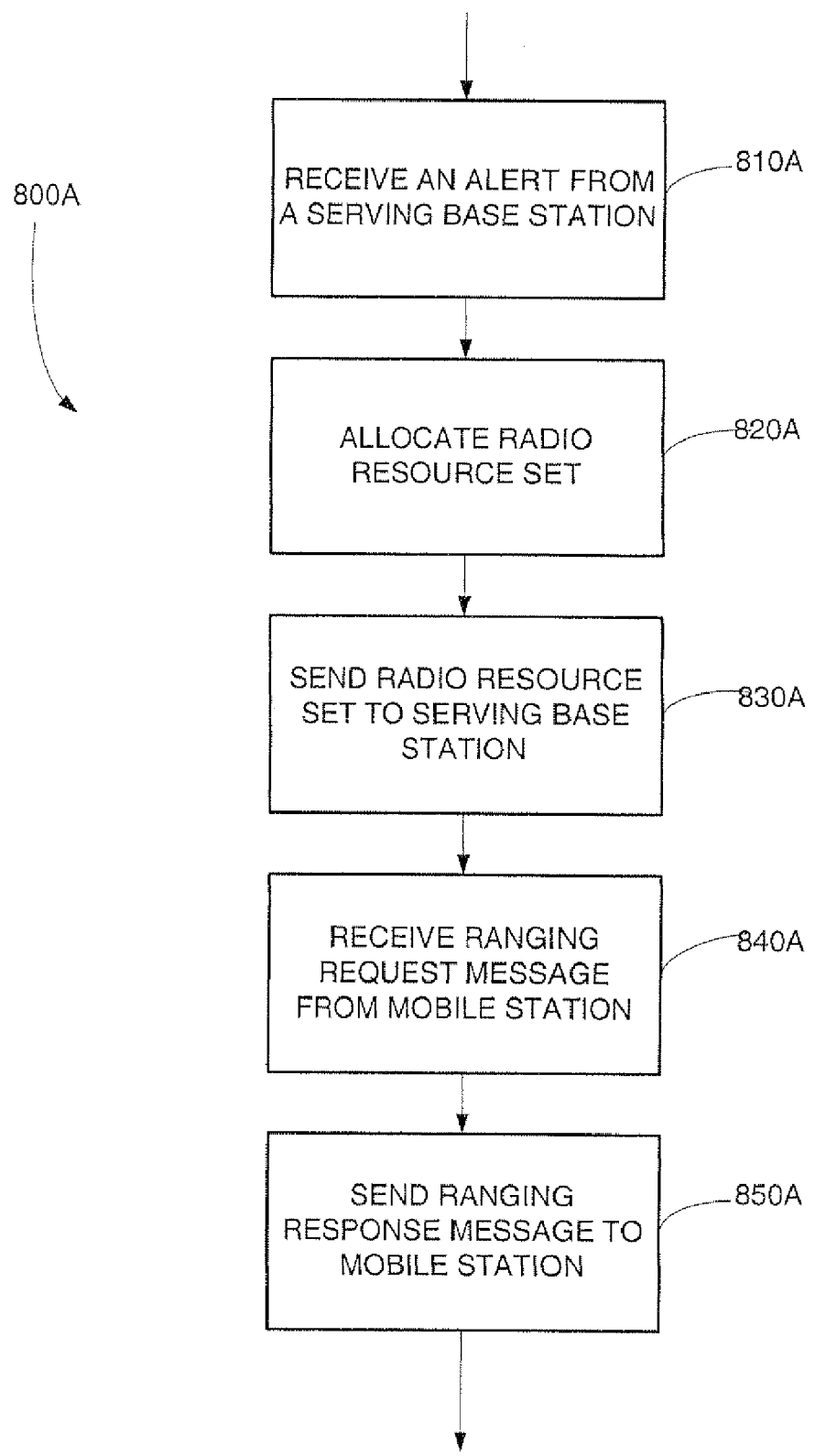
FIGS. 8A and 8B illustrate example non-limiting flowchart of methods to perform the handover from the perspective of the target base station.

FIG. 8A illustrates an example non-limiting flowchart of a method to perform the handover as experienced from the target base station. In act 810A, the target base station receives the alert (HO Pre-notification REQ/HO-REQ) message from the serving base station, for example, over the backbone. In act 820A, the target base station allocates the radio resource set (UL Slot IE) and sends (in act 830A) the radio resource set information to the serving base station over the network backbone, for example, as an alert response (HO Pre-notification RES/HO-RES) message with the radio resource set information piggy-backed thereon. In act 840A, the target base station receives the ranging request (RNG-REQ) message from the mobile station over the radio interface defined in the radio resource set, and in act 850A, the ranging response message, including the transmission profile, is sent to the mobile station by the target base station.

Figure 8B:
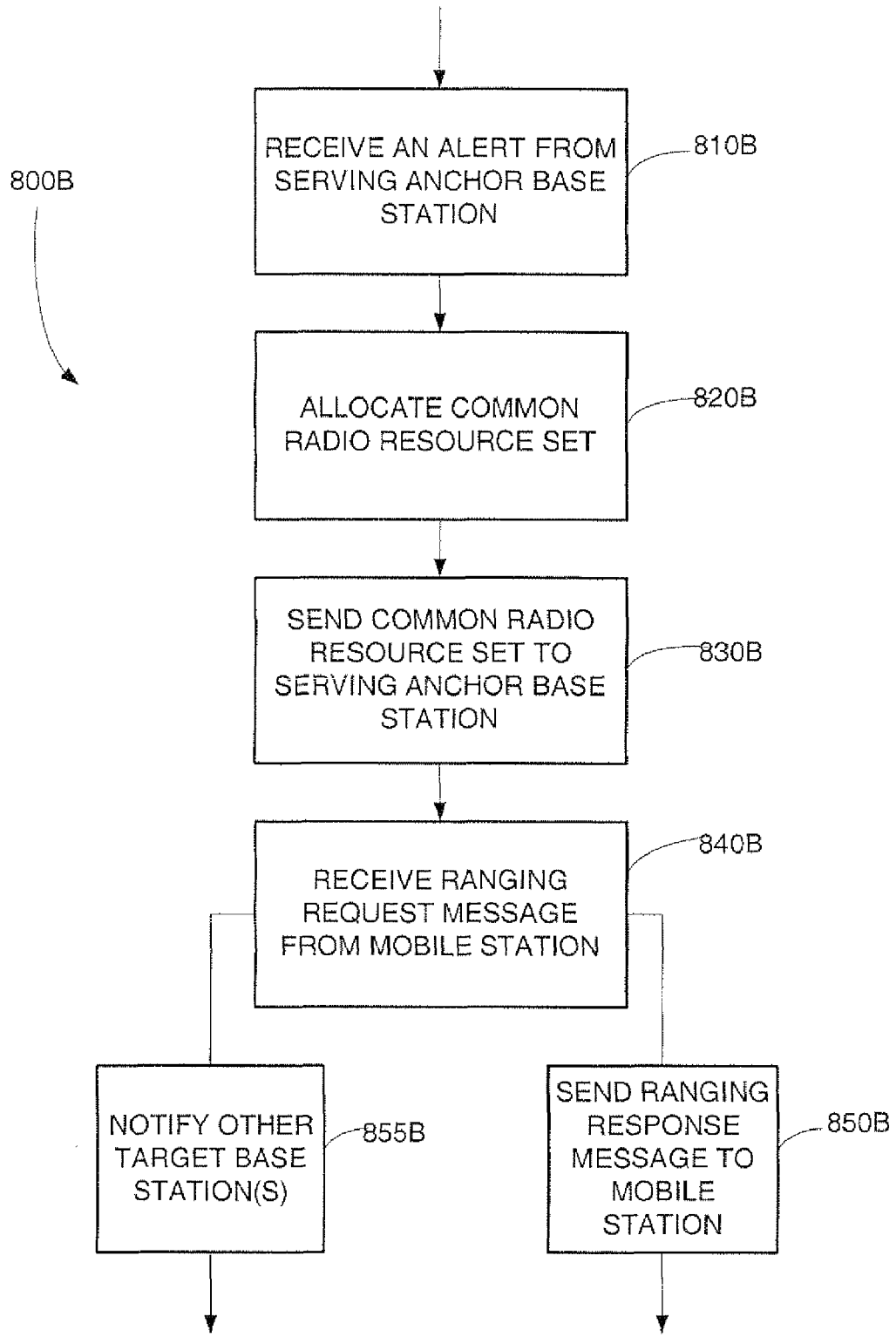

FIG. 8B illustrates another example non-limiting flowchart of a method to perform the handover as experienced from the anchor target base station. In act 810B, the anchor target base station receives an alert message from a serving base station, for example, from an anchor serving base station. In act 820B, the common radio resource set is allocated and sent (in act 830B) by the anchor target base station to the serving base station piggybacked to the alert response message. In act 840B, the anchor target base station receives the ranging request (RNG-REQ) message from the mobile station over the common radio resource set, and in act 850B, the ranging response message, including the transmission profile which includes the timing offset among others is sent to the mobile station by the anchor target base station. The method also includes notifying other target base station(s) in act 855B.

Figure 9A:
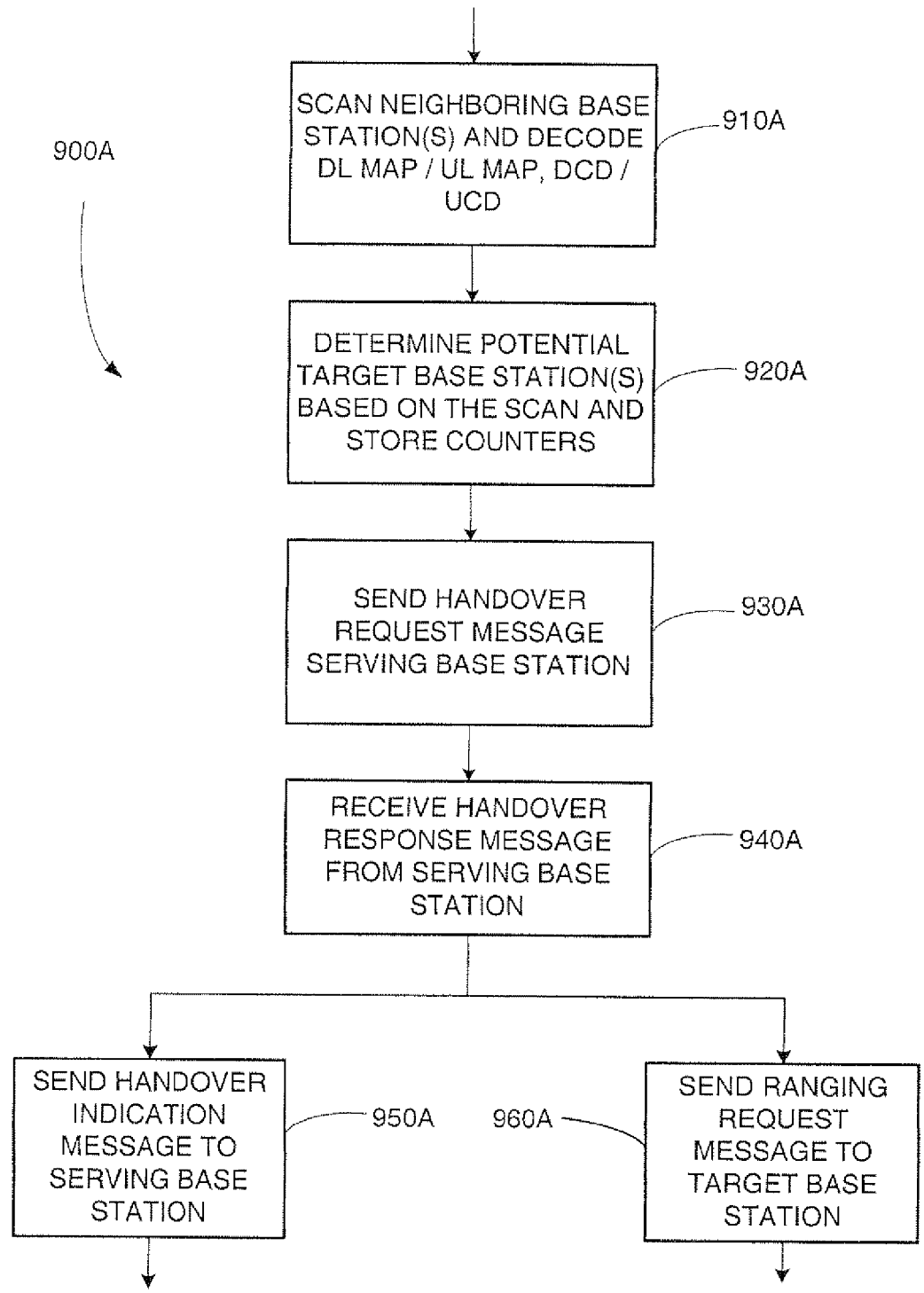
FIGS. 9A and 9B illustrate example non-limiting flowchart of methods to perform the handover from the perspective of the mobile base station.

FIG. 9A illustrates an example non-limiting flowchart of a method 900A to perform the handover as experienced from the mobile station in which the mobile station initiates the handover. In act 910A, the mobile station scans neighboring base station(s) and decodes the DL MAP/UL MAP and DCD/UCD among other parameters for neighboring base station. In act 920A, the mobile station determines a list of potential target base station(s) based on the scanning result. For example, the potential target base station(s) may be determined based on the signal strength received from each neighboring base station being above a predetermined threshold. The mobile station stores counters such as T1 for the DCD and the time the mobile station receives the DL MAP for each neighboring base station.

When the handover decision is made, the mobile station sends the handover request (MOB_MSHO-REQ) message to the serving base station over the serving radio link in act 930A (see also act 510A in FIG. 5A). The handover request message may include a list of the potential target base station(s). If the list includes only one, then by default, that becomes the selected target base station. Then the mobile station waits for the handover response (MOB_BSHO-RES) message from the serving base station in act 940A (see also act 540A in FIG. 5A). The radio resource set information for the potential target base station(s) is(are) piggybacked onto the handover response message. The target base station is selected based on the resource set information of the potential target base station(s).

In act 950A, the mobile station sends the handover indication (MOB_HO-IND) message to the serving base station. Assuming that the mobile station is ready to proceed with the handover execution, the server radio link may be broken after handover indication message is sent (see also act 320A in FIG. 3A). In act 960A, the mobile station sends to the target base station the ranging request (RNG-REQ) message over a radio interface using the radio resource set allocated for the process (see also act 610A in FIG. 6A). If the target base station is an anchor target base station, then the radio resource set is a common radio resource set to communicate with plural target base stations (see also act 610B in FIG. 6B). Act 960A starts the process of establishing the target radio link with the target base station (see also act 340A in FIG. 3A) or establishing the common target radio link with plural target base stations (see also act 340B in FIG. 3B) and the process can proceed correspondingly as illustrated in FIGS. 6A or 6B.

The order of performing acts 950A and 960A is not limited to any specific sequence. Act 950A may be performed before act 960A or vice versa or substantially simultaneously. However, it is preferred that the mobile station send the ranging request (RNG-REQ) message to the target base station (act 960A) prior to sending the handover indication (MOB_HO-IND) message to the serving base station (act 950A). This allows for even further reduction in the interruption time.

Figure 9B:
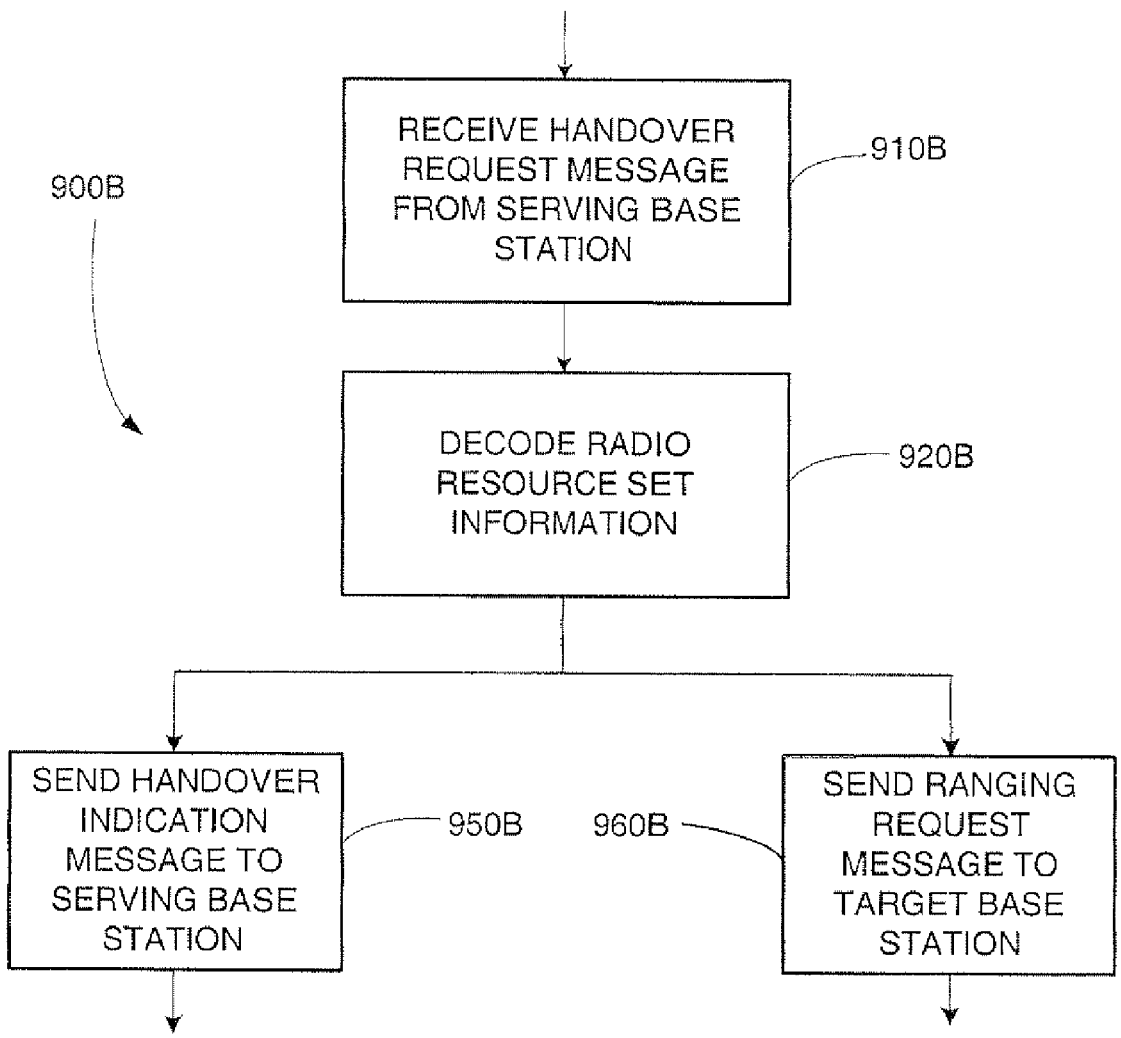

FIG. 9B illustrates another example non-limiting flowchart of a method 900B to perform the handover as experienced from the mobile station in which the serving base station initiates the handover. In this method, the serving base station determines the list of potential target base stations. In act 910B, the mobile station receives the base station initiated handover request (MOB_BSHO-REQ) message from the serving base station over the serving radio link (see also acts 550A and 550B in FIGS. 5A and 5B, respectively). The radio resource set for the target base station is piggy backed onto the handover request message. Where there are multiple potential target base stations, the radio resource set information for all potential target base stations are piggy-backed thereon and the target base station is selected based on the resource set information of the potential target base stations. If communication with plural target base stations is contemplated, the common radio resource set is piggy-backed.

When the MOB_BSHO-REQ message is sent by the serving base station, the serving base station may indicate one or more possible target base stations. It may also indicate the dedicated UL resources (UL Slot IE) for ranging request for the one or more possible target base stations. The mobile station checks if this information is included in the message by checking a piggyback indicator. If this indicator is enabled the mobile station decodes the UL slots IE The mobile station decodes the radio resource set information for each potential target base station provided in the handover request message in act 920B. Upon decoding the non-contentious uplink radio resources sent in UL Slot IE, the mobile station checks that it has the synchronization with the target base station by checking the Lost DL MAP interval (e.g., 600 ms) and a T1 counter (acquired earlier in scanning phase). If this interval has not elapsed, and the frame number (given in radio resource set) is still valid then the mobile station without having to decode the DL MAP, DCD message of target BS, can construct the RNG-REQ message for the target BS and send it, in a given frame number using the given non-contentious uplink radio resources.

Then the handover proceeds much like acts 950A and 960A. That is, in act 950B of FIG. 9B, the mobile station sends the handover indication (MOB_HO-IND) message to the serving base station. In act 960B, the mobile station sends to the target base station the ranging request (RNG-REQ) message over the radio interface using the radio resource set allocated for the process at the given frame number. The mobile station may send the RNG-REQ message to target base station and MOB-HO-IND message to serving base station in any order. However, similar to the situation described with respect to FIG. 9A, it is preferred that the ranging request (RNG-REQ) message precede the handover indication (MOB_HO-IND) message to minimize the interruption time.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby. Furthermore, no element, component, or method act in the present disclosure is intended to be dedicated to the public. Yet further, in the method claims, the acts of the method are provided with parenthetical notations (a), (b), (c) and so on. These are provided merely for ease of reference and are not meant to convey that the acts are to be performed in any specific order.

What is claimed is:

1. A method to perform a handover process of handing over a mobile station from a serving base station to a target base station in a wireless network, comprising:
    (a) allocating and providing to the mobile station a radio resource set for use by the mobile station to establish a target radio link between the mobile station and the target base station;
    (b) breaking a serving radio link between the mobile station and the serving base station; and
    (c) establishing the target radio link between the mobile station and the target base station using the radio resource set,
    wherein act (a) occurs before acts (b) and (c), and
    wherein in act (a),
        the radio resources set is allocated by the target base station, and information on the radio resource set is provided to the mobile station from the serving base station,
        when the mobile station initiates the handover process, the serving base station piggy-backs the radio resource set information onto a handover response message to the mobile station in response to the mobile station initiating the handover process, and
        when the serving base station initiates the handover process, the serving base station piggy-backs the radio resource set information onto a handover request message to the mobile station.

2. The method of claim 1, wherein the radio resource set allocated in act (a) is a non-contentious uplink radio resource set reserved for the mobile station.

3. The method of claim 2, wherein the non-contentious uplink radio resource set includes one or more of frame number index n, n+1, uplink interval usage code (UIUC), ranging code, ranging subchannel, uplink (UL) initial transmit timing, symbol offset, connection identifier (CID) field in media access control (MAC) header, handover identity (HO_ID), and carrier frequency to be used by the mobile station during an uplink access.

4. The method of claim 1, wherein act (a) comprises:
    (a.a) alerting the target base station by the serving base station of the handover about to be performed in an alert message;
    (a.b) allocating by the target base station the radio resource set for the mobile station in response to the alert message;
    (a.c) providing from the target base station information related to the allocated radio resource set to the serving base station piggy-backed onto an alert response message to the serving base station; and
    (a.d) relaying the radio resource set information to the mobile station from the serving base station piggy-backed onto the handover response message when the mobile station initiates the handover process, and relaying the radio resource set information to the mobile station from the serving base station piggy-backed onto the handover request message when the serving base station initiates the handover process.

5. The method of claim 4, wherein the radio resource set includes information defining a non-contentious opportunity for the mobile station to perform a ranging process with the target base station.

6. The method of claim 4,
    wherein the target base station is selected from among plural potential target base stations, and
    wherein acts (a.a), (a.b), (a.c) and (a.d) are performed for each potential target base station.

7. The method of claim 1, wherein act (a) comprises:
    (a.e) sending a handover pre-notification request (HO Pre-notification REQ/HO-REQ) message from the serving base station to the target base station over a network backbone;
    (a.f) sending, in response to the HO Pre-notification REQ/HO-REQ message, a handover pre-notification response (HO Pre-notification RES/HO-RES) message from the target base station to the serving base station over the network backbone;
    (a.g) sending, in response to the HO Pre-notification RES/HO-RES message, a base station handover response (MOB_BSHO-RES) message from the serving base station to the mobile station when the mobile station initiates the handover process by sending a mobile station initiated handover request (MOB_MSHO-REQ) message to the serving base station over the serving radio link; and
    (a.h) sending, in response to the HO Pre-notification RES/HO-RES message, a base station handover response (MOB_BSHO-REQ message from the serving base station to the mobile station over the serving radio link when the serving base station initiates the handover process,
    wherein in act (a.f), the radio resource set information is piggy-backed onto the HO Pre-notification RES/HO-RES message, the radio resource set including a non-contentious opportunity for the mobile station to perform a ranging process with the target base station,
    wherein in act (a.g), the radio resource set information is piggy-backed onto the MOB_BSHO-RES message, and
    wherein in act (a.h), the radio resource set information is piggy-backed onto the MOB_BSHO-REQ message.

8. The method of claim 7, wherein the radio resource set includes a uplink (UL) Slot information element (IE), UL-MAP, uplink channel descriptor (UCD) and downlink channel descriptor (DCD), and the non contentious opportunity for the mobile station to perform the ranging process is defined in the UL Slot IE.

9. The method of claim 1, wherein act (c) comprises:

(c.a) sending a ranging request message from the mobile station to the target base station using the radio resource set over a radio interface that is listened to by the target base station;

(c.b) sending, in response to the ranging request message, a ranging response message from the target base station to the mobile station over the radio interface, wherein the ranging response message includes a transmission profile for the mobile station;

(c.c) adjusting transmission parameters of the mobile station based on the transmission profile; and (c.d) exchanging data between the mobile station and the target base station based on the adjusted transmission parameters.

10. The method of claim 9, wherein the handover to plural target base stations is performed, wherein the target base station is an anchor target base station of the plural target base stations, and wherein the method further comprises notifying other target base stations by the anchor target base station so that the plural target base stations can exchange data with the mobile station in act (c.d).

11. The method of claim 1, wherein the handover response message and the handover request message are media access control (MAC) messages, and wherein the resource set information is included as a part of the payload of the handover response and the handover request message.

12. A method to perform a handover process of handing over a mobile station from a serving base station to a target base station in a wireless network, comprising:

(a) alerting the target base station of the handover process about to be performed in an alert message from the serving base station;

(b) receiving, subsequent to alerting the target base station, from the target base station information on a radio resource set corresponding to the target base station, wherein the radio resource set is for use by the mobile station to establish a target radio link with the target base station and the radio resource set information is piggy-backed onto an alert response message from the target base station;

(c) relaying, subsequent to receiving the radio set information from the target base station, the radio resource set information to the mobile station over a serving radio link piggy-backed onto a handover response message when the mobile station initiates the handover process, and piggy-backed onto a handover request message when the serving base station initiates the handover process; and (d) breaking the serving radio link after relaying the radio set information, wherein the method is performed by the serving base station.

13. The method of claim 12, wherein the target base station is selected from among plural potential target base stations, and wherein acts (a), (b) and (c) are performed for each potential target base station.

14. The method of claim 12, wherein the serving base station is an anchor serving base station of plural serving base stations, wherein the serving radio link is a common serving radio link between the mobile station and the plural serving base station, wherein the method further comprises notifying other serving base station so that the common serving radio link can be broken for all plural serving base stations in act (d).

15. The method of claim 12, wherein act (a) comprises sending a handover pre-notification request (HO Pre-notification REQ/HO-REQ) message to the target base station over a network backbone, wherein act (b) comprises receiving a handover pre-notification response (HO Pre-notification RES/HO-RES) message from the target base station over the network backbone, wherein the radio resource set information is piggy-backed onto the HO Pre-notification RES/HO-RES message, wherein the radio resource set includes a non-contentious uplink access time slot for the mobile station to transmit a ranging request (RNG-REQ) message to the target base station, and wherein act (c) comprises:

when the mobile station initiates the handover process, receiving a mobile station initiated handover request (MOB_MSHO-REQ) message from the mobile station prior to act (a) and sending a base station handover response (MOB_BSHO-RES) message over the serving radio link to the mobile station after act (b), the radio resource set information being piggy-backed on to the MOB_BSHO-RES message; and when the serving base station initiates the handover process, sending a base station initiated handover request (MOB_BSHO-REQ) message over the serving radio link to the mobile station after act (b), the radio resource set information being piggy-backed on to the MOB_BSHO-REQ message.

16. The method of claim 15, wherein the radio resource set includes a uplink (UL) Slot information element (IE), UL-MAP, uplink channel descriptor (UCD) and downlink channel descriptor (DCD), and the non contentious uplink access time slot is defined in the UL Slot IE providing the mobile station a non-contention based ranging opportunity.

17. The method of claim 12, wherein the alert response message, the handover response message and the handover request message are media access control (MAC) messages, and wherein the resource set information is included as a part of the payload of the alert response, the handover response and the handover request messages.

18. A method to perform a handover process of handing over a mobile station from a serving base station to a target base station in a wireless network, comprising:

(a) receiving an alert message from the serving base station of the handover about to be performed;

(b) allocating, in response to the alert message from the serving based station, the radio resource set for use by the mobile station to establish a target radio link with the target base station;

(c) sending information related to the radio resource set to the serving base station, the radio resource set information being piggy-backed on an alert response message sent to the serving base station;

(d) receiving, subsequent to sending the radio resource set information to the serving base station, a ranging request message from the mobile station using the radio resource set over a radio interface listened to by the target base station; and (e) sending, in response to the ranging request message from the mobile station, a ranging response message to the mobile station over the radio interface, wherein the method is performed by the target base station.

19. The method of claim 18,
wherein the target base station is an anchor serving base station of plural target base stations,
wherein the target radio link is a common target radio link between the mobile station and the plural target base station,
wherein the method further comprises notifying other target base stations so that the common target radio link can be established for all plural target base stations.

20. The method of claim 18,
wherein act (a) comprises receiving a handover pre-notification request (HO Pre-notification REQ/HO-REQ) message from the serving base station over a network backbone,
wherein act (c) comprises sending a handover pre-notification response (HO Pre-notification RES/HO-RES) message to the serving base station over the network backbone,
wherein the radio resource set information is piggy-backed onto the HO Pre-notification RES/HO-RES message,
wherein the radio resource set includes an uplink time slot for the mobile station to transmit a ranging request (RNG-REQ) message to the target base station,
wherein act (d) comprises listening for the RNG-REQ message from the mobile station during the uplink time slot over the radio interface, and
wherein act (e) comprises sending a ranging response (RNG-RES) message to the mobile station in response to the RNG-REQ message.

21. The method of claim 20, wherein
the radio resource set includes a uplink (UL) Slot information element (IE), UL-MAP, uplink channel descriptor (UCD) and downlink channel descriptor (DCD), and
the uplink time slot is defined as in the UL Slot IE, providing the mobile station a non-contention based ranging opportunity.

22. The method of claim 18,
wherein the alert response message is a media access control (MAC) message, and
wherein the resource set information is included as a part of the payload of the alert response message.

23. A method to perform a handover process of handing over a mobile station from a serving base station to a target base station in a wireless network, comprising:

(a) scanning for one or more neighboring base stations to acquire and decode downlink (DL) MAP/uplink (UL) MAP and downlink channel descriptor (DCD)/uplink channel descriptor (UCD) parameters and store the DL MAP/UL MAP counters including a T1 counter and store a Lost DL MAP interval, for each neighboring base station;

(b) determining a list of one or more potential target base stations based on the scanning;

(c) sending a handover request message to the serving base station over a serving radio link, the handover request message including the list of one or more potential target base stations;

(d) receiving, subsequent to sending the handover request message to the serving base station, a handover response message over the serving radio link from the serving base station, the handover response message having piggy-backed thereon information on radio resource set(s) corresponding to the one or more potential target base stations including the radio resource set information corresponding to the target base station selected among the one or more potential target base stations, the radio resource set being allocated for use by the mobile station to establish a target radio link with the target base station;

(e) sending, subsequent to receiving the handover response message from the serving base station, a handover indication message over the serving radio link to the serving base station to break the serving radio link; and (f) sending, subsequent to receiving the handover response message from the serving base station, to the target base station a ranging request message over a radio interface listened to by the target base station using the radio resource set, wherein the method is performed by the mobile station.

24. The method of claim 23,
wherein act (c) comprises sending a mobile station initiated handover request (MOB_MSHO-REQ) message to the serving base station over the serving radio link,
wherein act (d) comprises receiving a base station handover response (MOB_BSHO-RES) message from the serving base station over the serving radio link,
wherein act (e) comprises sending a mobile station handover indication (MOB_HO-IND) message to the serving base station over the serving radio link;
wherein act (f) comprises sending a ranging request (RNG-REQ) message to the target base station over the radio interface,
wherein the radio resource set information is piggy-backed onto the MOB_BSHO-RES message received from the serving base station, and
wherein the radio resource set includes an uplink time slot for the mobile station to transmit the RNG-REQ message to the target base station.

25. The method of claim 24, wherein
the radio resource set includes a uplink (UL) Slot information element (IE), UL-MAP, uplink channel descriptor (UCD) and downlink channel descriptor (DCD), and
the uplink time slot is defined in the UL Slot (IE) providing the mobile station a non-contention based ranging opportunity.

26. The method of claim 24, wherein the MOB_BSHO-RES message includes a piggyback indicator whose value indicates whether the information on radio resource set(s) for the one or more potential target base stations are piggybacked onto the MOB_BSHO-RES message.

27. The method of claim 23, wherein in act (b), the mobile station determines the list of the one or more potential target base stations based on any one or more of a signal strength, the T1 counter for a downlink channel descriptor (DCD), the Lost DL MAP interval and time of receipt of a DL MAP for each neighboring base station.

28. The method of claim 23, wherein act (f) is performed before act (e) or acts (f) and (e) are performed substantially simultaneously.

29. The method of claim 23,
wherein the handover response message is a media access control (MAC) message, and
wherein the resource set information is included as a part of the payload of the handover response message.

30. A method to perform a handover process of handing over a mobile station from a serving base station to a target base station in a wireless network, comprising:
   (a) receiving a handover request message over a serving radio link from the serving base station, the handover request message having piggy-backed thereon one or more radio resource set information corresponding to one or more potential target base stations;
   (b) decoding the one or more radio resource set information to select the target base station from among the one or more potential target base stations, wherein the radio resource set information corresponding to the target base station is allocated by the target base station for use by the mobile station to establish a target radio link with the target base station;
   (c) sending, subsequent to decoding and selecting the target base station, a handover indication message over the serving radio link to the serving base station to break the serving radio link; and
   (d) sending, subsequent to decoding and selecting the target base station, to the target base station a ranging request message using the radio resource set over a radio interface listened to by the target base station,
wherein the method is performed by the mobile station.

31. The method of claim 30,
wherein act (a) comprises receiving a base station initiated handover request (MOB_BSHO-REQ) message from the serving base station over the serving radio link,
wherein act (c) comprises sending a mobile station handover indication (MOB_HO-IND) message to the serving base station over the serving radio link;
wherein act (d) comprises sending a ranging request (RNG-REQ) message to the target base station over the radio interface,
wherein the radio resource set information is piggy-backed onto the MOB_BSHO-REQ message, and
wherein the radio resource set includes a non contentious uplink access information for the mobile station to transmit the RNG-REQ message to the target base station.

32. The method of claim 31, wherein the MOB_BSHO-REQ message includes a piggyback indicator whose value indicates whether the information on radio resource set(s) for the one or more potential target base stations are piggybacked onto the MOB_BSHO-REQ message.

33. The method of claim 30, wherein in act (b), the mobile station determines from a lost downlink (DL) MAP interval whether a given frame number in the radio resource set of the target base station is valid and the mobile station selects the target base station based on the determinations.

34. The method of claim 30, wherein act (d) is performed before act (c) or acts (d) and (c) are performed substantially simultaneously.

35. The method of claim 30,
wherein the handover request message is a media access control (MAC) message, and
wherein the resource set information is included as a part of the payload of the handover request message.

* * * * *

UNITED STATES PATENT AND TRADEMARK OFFICE
CERTIFICATE OF CORRECTION

PATENT NO.         : 8,126,462 B2
APPLICATION NO.    : 12/105650
DATED              : February 28, 2012
INVENTOR(S)        : Thakare Page 1 of 2

It is certified that error appears in the above-identified patent and that said Letters Patent is hereby corrected as shown below:

In Fig. 5A, Sheet 12 of 21, for Tag "550A", Line 3, delete "SATION" and insert -- STATION --, therefor.

In Fig. 5B, Sheet 13 of 21, for Tag "550B", Line 3, delete "SATION" and insert -- STATION --, therefor.

In Column 10, Line 20, delete "piggybacked" and insert -- piggy-backed --, therefor.

In Column 11, Line 1, delete "piggybacked" and insert -- piggy-backed --, therefor.

In Column 11, Line 8, delete "piggybacked." and insert -- piggy-backed. --, therefor.

In Column 11, Line 27, delete "piggybacked" and insert -- piggy-backed --, therefor.

In Column 11, Line 31, delete "piggybacks the UL Slot E" and insert -- piggy-backs the UL Slot IE --, therefor.

In Column 12, Line 33, delete "piggybacked" and insert -- piggy-backed --, therefor.

In Column 13, Line 29, delete "piggybacked" and insert -- piggy-backed --, therefor.

In Column 13, Line 32, delete "85013," and insert -- 850B, --, therefor.

In Column 13, Line 61, delete "piggybacked" and insert -- piggy-backed --, therefor.

In Column 14, Line 32, delete "piggy backed" and insert -- piggy-backed --, therefor.

In Column 14, Line 47, delete "IE" and insert -- IE. --, therefor.

Signed and Sealed this
Tenth Day of July, 2012

David J. Kappos
*Director of the United States Patent and Trademark Office*

CERTIFICATE OF CORRECTION (continued)
U.S. Pat. No. 8,126,462 B2

In Column 16, Lines 53-54, in Claim 6, delete "response (MOB_BSHO-REQ" and insert -- request (MOB_BSHO-REQ) --, therefor.

In Column 17, Line 5, in Claim 8, delete "non contentious" and insert -- non-contentious --, therefor.

In Column 17, Line 38, in Claim 11, delete "message." and insert -- messages. --, therefor.

In Column 18, Line 47, in Claim 16, delete "non contentious" and insert -- non-contentious --, therefor.

In Column 18, Line 63, in Claim 18, delete "serving based station, the radio" and insert -- serving base station, a radio --, therefor.

In Column 20, Line 57, in Claim 26, delete "piggybacked" and insert -- piggy-backed --, therefor.

In Column 22, Line 9, in Claim 31, delete "non contentious" and insert -- non-contentious --, therefor.

In Column 22, Line 15, in Claim 32, delete "piggybacked" and insert -- piggy-backed --, therefor.